US012736144B2

(12) United States Patent
Kumamoto

(10) Patent No.: US 12,736,144 B2
(45) Date of Patent: Sep. 15, 2026

(54) VORTEX-TYPE FLOW CONTROL VALVE

(71) Applicant: ASAHI YUKIZAI CORPORATION, Nobeoka (JP)

(72) Inventor: Kota Kumamoto, Nobeoka (JP)

(73) Assignee: ASAHI YUKIZAI CORPORATION, Nobeoka (JP)

( * ) Notice: Subject to any disclaimer, the term of this patent is extended or adjusted under 35 U.S.C. 154(b) by 0 days.

(21) Appl. No.: 18/868,173

(22) PCT Filed: May 22, 2023

(86) PCT No.: PCT/JP2023/019009

§ 371 (c)(1),
(2) Date: Nov. 22, 2024

(87) PCT Pub. No.: WO2023/228915

PCT Pub. Date: Nov. 30, 2023

(65) Prior Publication Data

US 2025/0327528 A1 Oct. 23, 2025

(30) Foreign Application Priority Data

May 23, 2022 (JP) ................................ 2022-084137

(51) Int. Cl.
*F16K 13/10* (2006.01)

(52) U.S. Cl.
CPC .................................. *F16K 13/10* (2013.01)

(58) Field of Classification Search
CPC . F16K 13/10; F16K 13/00; F16K 7/04; F16K 27/0236; Y10T 137/2109
See application file for complete search history.

(56) References Cited

U.S. PATENT DOCUMENTS 2,598,187 A * 5/1952 Meyer .................... F16K 25/04 251/126
3,198,214 A * 8/1965 Lorenz ..................... F15C 1/02 239/468

(Continued)

FOREIGN PATENT DOCUMENTS

DE 337118 C * 5/1921
GB 384422 A * 12/1932 .............. F16K 1/08

(Continued)

OTHER PUBLICATIONS

PCT/ISA/210, "International Search Report for International Application No. PCT/JP2023/019009," Aug. 8, 2023, 4pp.

*Primary Examiner* — Marina A Tietjen
(74) *Attorney, Agent, or Firm* — HAUPTMAN HAM, LLP

(57) ABSTRACT

A vortex-type flow regulation valve includes: a vortex chamber having a cylinder-shaped circumferential side wall, a first end wall and a second end wall; an inlet flow passage that extends along an inlet flow passage center axis and opens in the circumferential side wall; an outlet flow passage that extends along an outlet flow passage center axis and opens into the first end wall; a protrusion protruding into the vortex chamber from one of the first end wall and the second end wall; and a driving unit that causes the protrusion to move toward and away from the other of the first end wall and the second end wall, within the vortex chamber. The inlet flow passage center axis passes through a location distanced from a vortex chamber center axis, and the movement of the protrusion regulates the flow rate of a fluid flowing out from the outlet flow passage.

11 Claims, 18 Drawing Sheets

(56) References Cited

U.S. PATENT DOCUMENTS

| | | | | | |
|---|---|---|---|---|---|
| 4,003,405 | A * | 1/1977 | Hayes | G05D 7/0113 138/40 |
| 4,791,961 | A * | 12/1988 | Nitzberg | F16L 55/1015 137/614.04 |
| 4,827,961 | A * | 5/1989 | Nitzberg | F16L 55/1015 251/126 |
| 5,573,029 | A * | 11/1996 | Freimann | F15D 1/0015 137/833 |
| 5,605,172 | A * | 2/1997 | Schubert | F16K 1/385 251/903 |
| 2006/0102748 | A1 | 5/2006 | Wu | |
| 2009/0072173 | A1 | 3/2009 | Hasunuma et al. | |
| 2010/0258754 | A1 * | 10/2010 | Haines | F16K 51/00 251/324 |
| 2014/0373951 | A1 * | 12/2014 | Griffin, Jr. | G05D 16/0655 137/808 |

FOREIGN PATENT DOCUMENTS

| | | | | |
|---|---|---|---|---|
| GB | 2133902 | A * | 8/1984 | F16K 47/02 |
| JP | S59-005209 | Y2 | 2/1984 | |
| JP | 2003-020959 | A | 1/2003 | |
| JP | 2004-136085 | A | 5/2004 | |
| JP | 2005-535445 | A | 11/2005 | |
| JP | 5144880 | B2 | 2/2013 | |

* cited by examiner

FIG. 17C
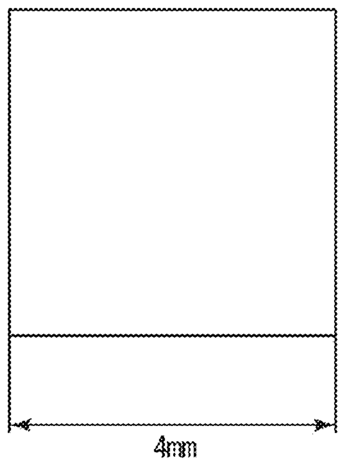
FIG, 18
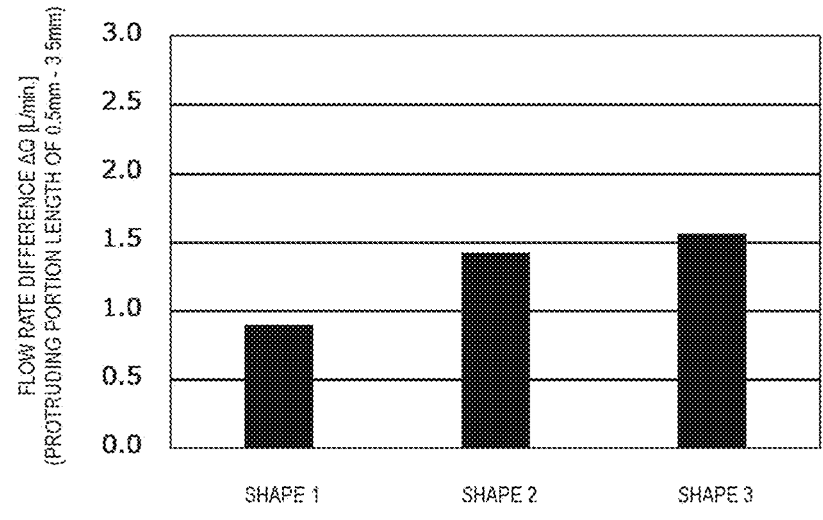

VORTEX-TYPE FLOW CONTROL VALVE

RELATED APPLICATIONS

The present application is a National Phase of International Application Number PCT/JP2023/019009 filed May 22, 2023 and claims priority to Japanese Application Number 2022-084137 filed May 23, 2022.

TECHNICAL FIELD

The present invention relates to a flow control valve, which is used for fluid transport piping lines in various industrial fields, such as chemical factories, semiconductor manufacturing fields, liquid crystal manufacturing fields, and food fields.

BACKGROUND ART

A needle valve is generally used in applications for adjusting flow rates in various industrial fields. For example, as described in PTL1, the needle valve inserts a tapered tip part of a valve element called a needle into a valve seat having a through-hole and moves a peripheral surface of the tip part of the needle closer to or away from the valve seat to change a gap between the needle and the valve seat, thereby adjusting a flow rate of fluid flowing through the gap between the needle and the valve seat. In order to enable fine adjustment of the flow rate, the gap between the needle and the valve seat is narrower than other flow passages in the needle valve. In particular, the gap between the needle and the valve seat is extremely narrow in the vicinity of a lower limit of an operating flow rate range of the needle valve.

CITATION LIST

Patent Documents

PTL1: Japanese Patent No. 5144880
PTL2: Japanese examined Utility Model Publication No.

SUMMARY OF THE INVENTION

Technical Problem

As described above, in the needle valve, the gap between the needle and the valve seat is narrow, and particularly, the gap between the needle and the valve seat is extremely narrow in the vicinity of the lower limit of the operating flow rate range of the needle valve. Therefore, if coaxiality between the needle and the valve seat is poor, the needle and the valve seat, which should not originally come into contact with each other, may come into contact with each other and slide on each other when the flow rate is adjusted to a low flow rate, resulting in abrasion of the needle and the valve seat. When such abrasion occurs, the gap between the needle and the valve seat, that is, the relationship between the opening degree of the needle valve and the flow rate, is changed, and it is difficult to adjust the flow rate accurately. In addition, particles generated due to the abrasion are mixed in the fluid. Such mixing of the particles into the fluid is a significant problem, particularly in the semiconductor manufacturing field. In a case where the needle is driven by an electric actuator and the flow rate is frequently adjusted by feedback control or the like, the needle is constantly reciprocated, making the above-described problem particularly noticeable. When the relationship between the opening degree of the needle valve and the flow rate is changed, it is necessary to adjust control parameters in feedback control or the like again. In such a case, the needle valve is often replaced, in effect, as the needle valve has come to the end of the life, leading to increased maintenance costs.

As a method for avoiding sliding between the valve element and the valve seat, there is, for example, a method using a vortex-type fluid element that utilizes swirling flow, as disclosed in PTL2. The vortex-type fluid element disclosed in PTL2 consists of a vortex chamber having an output port at a center part thereof, an input nozzle connected to an outer peripheral part of the vortex chamber and restricting a direction of fluid from an input port toward the output port, and a control nozzle that ejects a control flow for turning the fluid ejected from the input nozzle into a vortex flow in the vortex chamber near an outlet of the nozzle to the vortex chamber. In an interference area, the control flow ejected from the control nozzle is deflected by colliding with a jet flow ejected from the input nozzle to generate the vortex flow in the vortex chamber. Generation of the vortex flow causes a pressure difference between the interference area and the output port to increase flow rate resistance, thereby controlling an output flow rate. However, although the valve element and the valve seat do not come into contact with each other in such a vortex-type fluid element, it is necessary to adjust the flow rate of the control flow ejected from the control nozzle in order to control the flow rate. Therefore, a flow control valve is required in the flow rate adjustment of the control flow, which ultimately leaves a possibility of particles being mixed into the control flow.

Accordingly, an object of the present invention is to solve the problems existing in the prior art and to provide a flow control valve in which contact between a valve element and a valve seat does not occur in an area that is in contact with the fluid to be controlled.

Solution to Problem

In view of the above-described object, the present invention provides a vortex-type flow control valve including: a vortex chamber defined by a cylindrical peripheral side wall, a first end wall, and a second end wall, the first end wall and the second end wall provided opposite each other at both ends of the peripheral side wall; an inlet flow passage extending along an inlet flow passage central axis and being opened in the peripheral side wall; and an outlet flow passage extending along an outlet flow passage central axis and being opened in the first end wall, the vortex-type control valve configured so that fluid flowing in from the inlet flow passage generates a vortex flow in the vortex chamber and flows out into the outlet flow passage, in which the inlet flow passage is provided such that the inlet flow passage central axis extends through a position away from a vortex chamber central axis connecting the center of the first end wall and the center of the second end wall, and the vortex-type flow control valve further includes a protruding portion protruding into the vortex chamber from one of the first end wall and the second end wall, and a drive unit moving the protruding portion closer to or away from the other of the first end wall and the second end wall in the vortex chamber, the protruding portion being moved to adjust a flow rate of the fluid flowing out into the outlet flow passage.

In the above-described vortex-type flow control valve, the vortex chamber is defined by the cylindrical peripheral side wall, and the first and second end walls provided opposite each other at both ends of the peripheral side wall, the inlet flow passage is provided such that the inlet flow passage central axis of the inlet flow passage being opened in the peripheral side wall extends through the position away from the vortex chamber central axis connecting the centers of the first and second end walls of the vortex chamber, and the outlet flow passage is opened in the first end wall. Therefore, the fluid flowing in from the inlet flow passage flows out into the outlet flow passage after generating a swirling flow in the vortex chamber to flow in a vortex shape. As a result, a pressure loss is generated in accordance with a length of the swirling flow from the inflow through the inlet flow passage to the outflow into the outlet flow passage (that is, a length of a flow line of the vortex flow). The swirling flow (vortex flow) collides with the protruding portion provided on one of the first end wall and the second end wall so as to protrude into the vortex chamber, and a part of the swirling flow that has collided with the protruding portion flows toward the outlet flow passage in a shortcut manner. In a case where the protruding portion is moved closer to the other of the first end wall and the second end wall, a gap between a top part of the protruding portion and the other of the first end wall and the second end wall is decreased, and a proportion of the swirling flow colliding with the protruding portion is increased, so that a proportion of the swirling flow flowing toward the outlet flow passage in a shortcut manner is increased. On the contrary, in a case where the protruding portion is moved away from the other of the first end wall and the second end wall, the gap between the top part of the protruding portion and the other of the first end wall and the second end wall is increased, and the proportion of the swirling flow passing through the gap without colliding with the protruding portion is increased, so that the proportion of the swirling flow flowing toward the outlet flow passage in a shortcut manner is decreased. As described above, the pressure loss of the fluid generated while the fluid flows from the inlet flow passage to the outlet flow passage in the vortex chamber is proportional to the length of the flow line of the swirling flow (vortex flow) from the inflow through the inlet flow passage to the outflow into the outlet flow passage. Therefore, when the proportion of the swirling flow colliding with the protruding portion and flowing toward the outlet flow passage in a shortcut manner is increased, the length of the flow line of the swirling flow from the inlet flow passage to the outlet flow passage is decreased as a whole, resulting in a decrease in pressure loss and an increase in the flow rate of the outflow into the outlet flow passage. On the other hand, when the proportion of the swirling flow colliding with the protruding portion and flowing toward the outlet flow passage in a shortcut manner is decreased, the length of the flow line of the swirling flow from the inlet flow passage to the outlet flow passage is increased as a whole, resulting in an increase in pressure loss and a decrease in the flow rate of the outflow into the outlet flow passage. Utilizing such characteristics, the flow rate of the fluid flowing out into the outlet flow passage can be adjusted by using the drive unit to move the protruding portion provided on one of the first end wall and the second end wall closer to or away from the other of the first end wall and the second end wall.

In the above-described vortex-type flow control valve, it is preferable that the protruding portion is provided at a position eccentric from the vortex chamber central axis. In the vortex chamber, the center of the vortex chamber is the center of the vortex flow. Therefore, by arranging the protruding portion in this manner, the swirling flow (vortex flow) in the vortex chamber can easily collide with the protruding portion.

It is more preferable that the protruding portion is provided such that at least a part of the protruding portion extends to overlap an extension of the inlet flow passage into the vortex chamber. In a case where the protruding portion is arranged to overlap the extension of the inlet flow passage, the fluid flowing into the vortex chamber from the inlet flow passage surely will collide with the protruding portion, thus making it easier to obtain the above-described effect.

Further, it is preferable that the first end wall and the second end wall have a circular shape or an elliptical shape. In this case, the cross section of the vortex chamber perpendicular to the vortex chamber central axis, that is, the peripheral side wall of the vortex chamber has also a circular shape or an elliptical shape, so that the fluid flows along the peripheral side wall and the vortex flow is likely to be smoothly generated.

In one embodiment, the outlet flow passage may be provided such that the outlet flow passage central axis extends through a position away from the inlet flow passage central axis.

In another embodiment, the outlet flow passage may be provided such that the outlet flow passage axis extends on the vortex chamber central axis.

The outlet flow passage may be provided such that the outlet flow passage axis extends through a position deviated from the vortex chamber central axis toward the inlet flow passage central axis.

The protruding portion may be provided at a position deviated from the outlet flow passage central axis.

The protruding portion may have a circular cross section or an elliptical cross section.

The drive unit may drive the protruding portion to change a protruding length of the protruding portion into the vortex chamber.

In addition, the protruding portion may be provided on the second end wall. In this case, the first end wall can be constituted by a diaphragm, and the protruding portion can be attached to the diaphragm so that the protruding portion is driven by the drive unit via the diaphragm.

Advantageous Effect of the Invention

According to the present invention, the vortex flow is generated in the vortex chamber, and by moving the protruding portion relative to the other end wall opposite the one end wall provided with the protruding portion to change the proportion of the swirling flow colliding with the protruding portion, the proportion of the swirling flow colliding with the protruding portion and flowing toward the outlet flow passage in a shortcut manner is changed so that the length of the flow line of the swirling flow from the inlet flow passage to the outlet flow passage can be increased or decreased as a whole. Utilizing such characteristics, the flow rate of the fluid flowing out into the outlet flow passage can be adjusted by using the drive unit to move the protruding portion provided on one of the first end wall and the second end wall closer to or away from the other of the first end wall and the second end wall, thereby eliminating the need for the valve element and the valve seat to be provided in an area in contact with the fluid to be controlled. This makes it possible to eliminate a contact portion between the valve element and the valve seat. Therefore, it is not required to reset the parameters for flow rate control due to the abrasion of the valve element and the valve seat, and the mixing of the particles into the fluid can be suppressed.

BRIEF DESCRIPTION OF DRAWINGS

FIG. 17C is an explanatory diagram for illustrating the protruding portion of the vortex-type flow control valve used in the numerical simulation using the vortex-type flow control valve shown in FIG. 13, and shows the protruding portion having a square cross-sectional shape (shape 3).

FIG. 18 is a bar graph showing a comparison result of the flow rate differences ΔQ in a case where the length of the protruding portion was changed in a range of 0.5 mm to 3.5 mm for each shape of the protruding portion under a condition where the protruding portion having a cross section of the shape 1 was arranged at the angular position of 90° and deviated from the vortex chamber center by the distance of 3.5 mm, in the numerical simulation using the vortex-type flow control valve shown in FIG. 13.

DESCRIPTION OF EMBODIMENTS

Embodiments of a vortex-type flow control valve according to the present invention will be described below with reference to the drawings.

Figure 2:
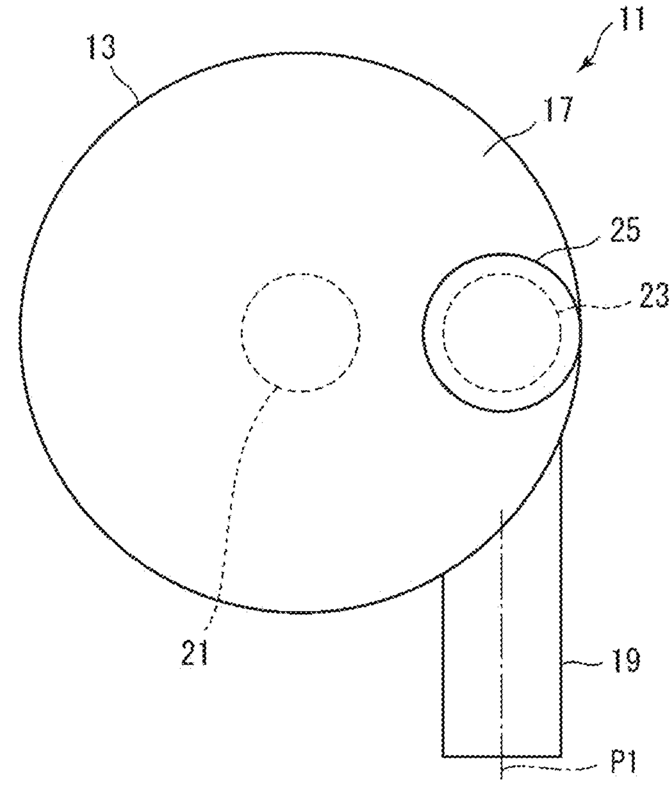
FIG. 2 is a plan view of the vortex-type flow control valve shown in FIG. 1 as viewed from above in FIG. 1.
Figure 3:
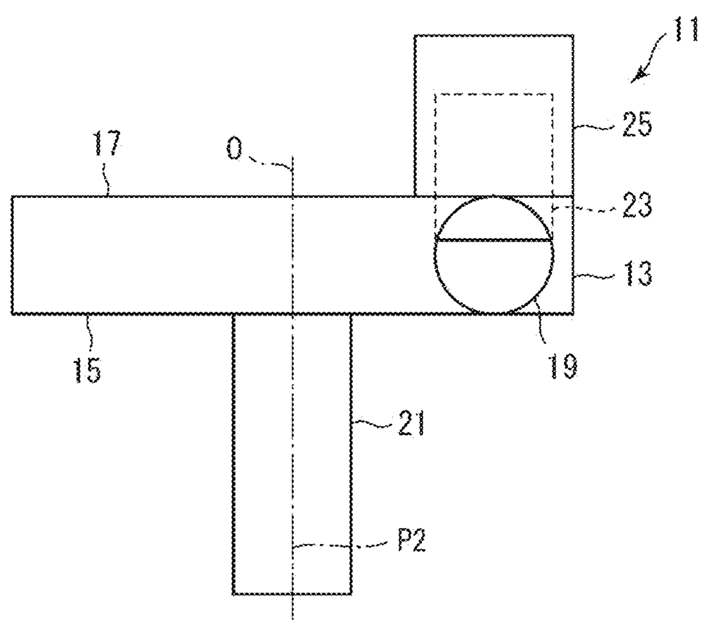
FIG. 3 is a side view of the vortex-type flow control valve shown in FIG. 1 as viewed from a side of FIG. 1.
Figure 4:
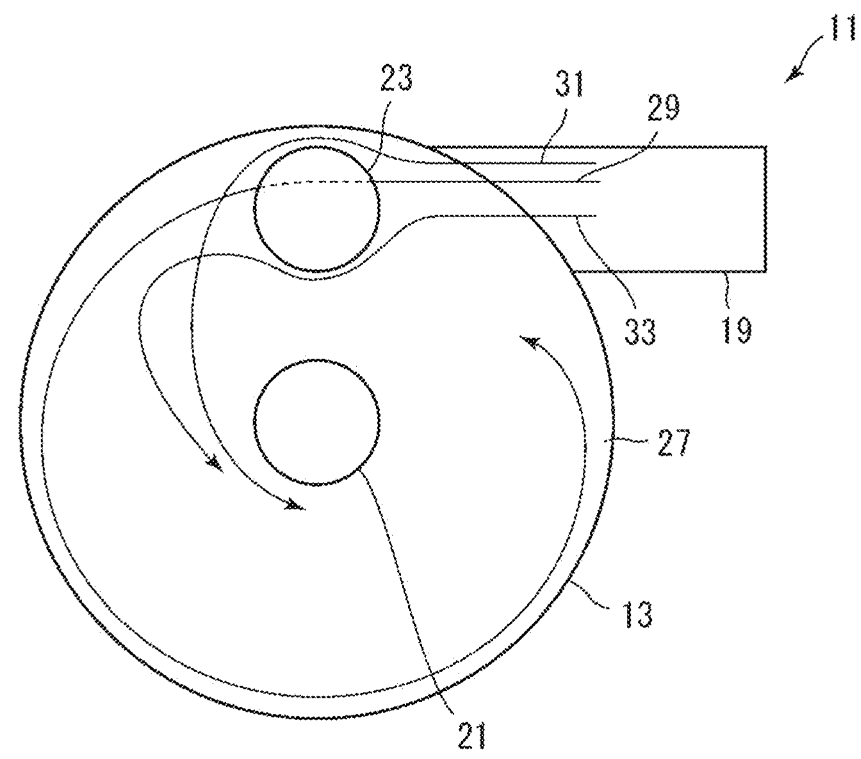
FIG. 4 is an explanatory diagram schematically showing a flow in a vortex chamber of the vortex-type flow control valve shown in FIG. 1, as viewed from above in FIG. 1.
Figure 5:
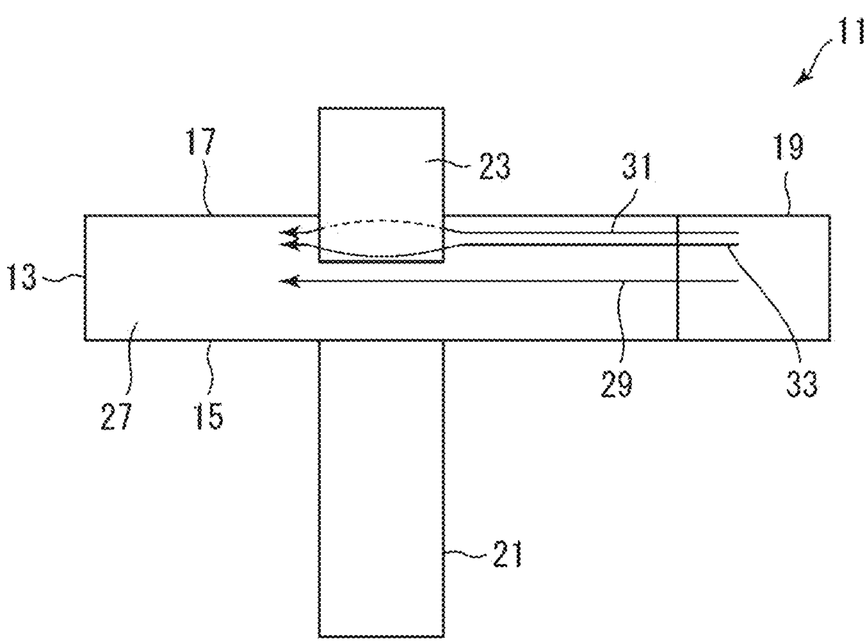
FIG. 5 is an explanatory diagram schematically showing the flow in the vortex chamber of the vortex-type flow control valve shown in FIG. 1, as viewed from a side of FIG. 1.

First, an overall configuration of a vortex-type flow control valve 11 according to a first embodiment will be described with reference to FIGS. 1 to 3.

The vortex-type flow control valve 11 includes a cylindrical peripheral side wall 13 extending along a central axis, a first end wall 15 and a second end wall 17 that are provided opposite each other at both ends of the peripheral side wall 13 in a central axis direction, an inlet flow passage 19, an outlet flow passage 21, a protruding portion 23, and a drive unit 25 for driving the protruding portion 23. The first end wall 15 and the second end wall 17 have the same shape and are provided so as to close end parts of the peripheral side wall 13 in the central axis direction, and a space surrounded by the peripheral side wall 13, the first end wall 15, and the second end wall 17 constitutes a vortex chamber 27. A vortex chamber central axis O, which extends to connect a center of the first end wall 15 and a center of the second end wall 17, coincides with the central axis of the peripheral side wall 13. In the present specification, the center of the first end wall 15 and the center of the second end wall 17 refer to a centroid position of the first end wall 15 and a centroid position of the second end wall 17, respectively. In the shown embodiment, the first end wall 15 and the second end wall 17 have a circular shape, and the peripheral side wall 13 has a circular cylindrical shape. However, the shapes of the first end wall 15 and the second end wall 17 are not limited to a circular shape, and can be any shape such as an elliptical shape or a polygonal shape such as a triangular shape or a quadrangular shape, as long as a vortex flow can be generated in the vortex chamber 27.

The inlet flow passage 19 extends along an inlet flow passage central axis P1 perpendicular to the vortex chamber central axis O and is opened in the peripheral side wall 13. The inlet flow passage central axis P1 extends to pass through a center of a cross section of the inlet flow passage 19. The outlet flow passage 21 extends from the vortex chamber 27 to the outside along an outlet flow passage central axis P2 parallel to the vortex chamber central axis O and is opened in the first end wall 15 of the vortex chamber 27. The outlet flow passage central axis P2 extends to pass through a center of a cross section of the outlet flow passage 21. In the shown embodiment, both the inlet flow passage 19 and the outlet flow passage 21 are constituted by circular pipes each having a circular cross-sectional shape. However, the cross sections of the inlet flow passage 19 and the outlet flow passage 21 are not limited to the circular shape, but can also be a polygonal shape such as an elliptical shape or a quadrangular shape. In the shown embodiment, the inlet flow passage 19 is constituted by a straight circular pipe, but may have other shapes such as a nozzle shape as long as the fluid can flow into the vortex chamber 27.

The inlet flow passage 19 is provided such that the inlet flow passage central axis P1 extends through an eccentric position away from the vortex chamber central axis O. Therefore, the fluid flowing into the vortex chamber 27 from the inlet flow passage 19 hits the peripheral side wall 13 in the vortex chamber 27 and flows along the peripheral side wall 13 to generate a swirling flow, which then becomes a vortex flow to the outlet flow passage 21 and flows out into the outlet flow passage 21. It is preferable that the inlet flow passage 19 is provided so that the fluid flowing into the vortex chamber 27 from the inlet flow passage 19 flows along the peripheral side wall 13 in order to facilitate the generation of a swirling flow. On the other hand, the outlet flow passage 21 can be provided at any position of the first end wall 15 as long as the fluid flowing into the vortex chamber 27 from the inlet flow passage 19 flows out into the outlet flow passage 21 after the vortex flow is generated. In other words, the outlet flow passage 21 may be provided so that the outlet flow passage central axis P2 extends through a position away from the inlet flow passage central axis P1 in order to prevent the fluid flowing into the vortex chamber 27 through the inlet flow passage 19 from flowing out into the outlet flow passage 21 as it is.

In the shown embodiment, the inlet flow passage 19 is connected to the peripheral side wall 13 such that the inlet flow passage 19 extends in a tangential direction of the cylindrical peripheral side wall 13 and the inlet flow passage central axis P1 extends parallel to the tangential line, so that the fluid flows into the vortex chamber 27 from the inlet flow passage 19 in a direction substantially tangential to the peripheral side wall 13. The outlet flow passage 21 is opened in the first end wall 15, so that the outlet flow passage 21 is provided such that the outlet flow passage central axis P2 extends to pass through the center of the first end wall 15, that is, the outlet flow passage central axis P2 extends on the vortex chamber central axis O. This configuration allows the fluid flowing in from the inlet flow passage 19 to flow along the peripheral side wall 13 in the vortex chamber 27, thereby generating the swirling flow to gradually move closer to the center part and flowing toward the outlet flow passage 21 in a vortex-like manner.

The protruding portion 23 is provided on the second end wall 17 to protrude into the vortex chamber 27 toward the first end wall 15, and is driven by the drive unit 25 to be movable in the vortex chamber 27 along a movement axis extending parallel to the vortex chamber central axis O. By using the drive unit 25 to move the protruding portion 23 in the vortex chamber 27, a distance (that is, a gap) between a top part of the protruding portion 23 extending from the second end wall 17 and the first end wall 15 opposite to the top part can be changed. In the shown embodiment, a cylinder mechanism that can change the protruding length of the protruding portion 23 into the vortex chamber 27 is used as the drive unit 25. However, the drive unit 25 is not limited to the cylinder mechanism, and another appropriate mechanism, such as an electric actuator, can be used as long as the protruding portion 23 is movable in the vortex chamber 27 to change the distance (that is, the gap) between the top part of the protruding portion 23 extending from the second end wall 17 and the first end wall 15 opposite to the top part. In addition, the drive unit can adopt various drive methods such as a manual method, an air drive method, and an electric method.

The protruding portion 23 has a columnar shape, and a cross section of the protruding portion 23 perpendicular to the movement axis can be any shape. The cross section of the protruding portion 23 can be, for example, a circular shape, an elliptical shape, a polygonal shape such as a quadrangular shape, a triangular shape, or a rhombus shape, or a plate shape. In the shown embodiment, the protruding portion 23 has a circular column shape with a circular cross section thereof. In addition, the protruding portion 23 can also have a conical shape or a polygonal pyramid shape, and a step or a groove may be provided on a peripheral surface of a columnar shape or a conical or pyramid-like shape.

It is preferable that the protruding portion 23 is arranged such that at least a part of the protruding portion 23 overlaps an extension of the inlet flow passage 19 into the vortex chamber 27, so that the swirling flow of the fluid flowing into the vortex chamber 27 from the inlet flow passage 19 collides with the protruding portion 23 more quickly. However, since the vortex flow is generated in the vortex chamber 27 as described above, the protruding portion 23 collides with the vortex flow in the vortex chamber 27 unless the protruding portion 23 is provided such that the movement axis thereof extends on the outlet flow passage central axis P2, that is, unless the protruding portion 23 is provided at a position facing the outlet flow passage 21. Therefore, the position of the protruding portion 23 is not particularly limited as long as the protruding portion 23 is provided at the position deviated from the position facing the outlet flow passage 21.

Next, an action of the vortex-type flow control valve 11 according to the present invention will be described with reference to FIGS. 4 to 8.

Figure 6:
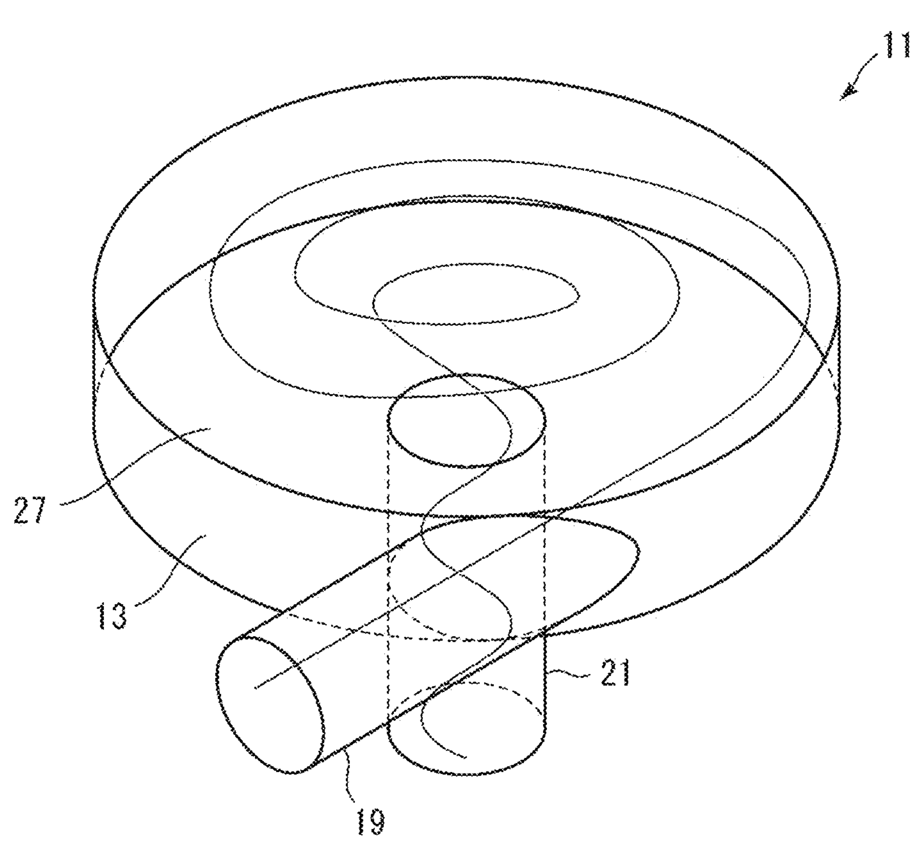
FIG. 6 is an explanatory diagram schematically showing a flow with a protruding portion not protruding into the vortex chamber of the vortex-type flow control valve shown in FIG. 1.

As described above, the inlet flow passage 19 is provided such that the inlet flow passage central axis P1 extends through the eccentric position away from the vortex chamber central axis O. Therefore, in a case where the protruding portion 23 does not protrude into the vortex chamber 27, as shown in FIG. 6, the fluid flowing in from the inlet flow passage 19 generates the swirling flow in the vortex chamber 27, is directed toward the outlet flow passage 21 while swirling, and flows out into the outlet flow passage 21. On the other hand, in a case where the protruding portion 23 protrudes into the vortex chamber 27, the fluid that can flow through the gap between the top part of the protruding portion 23 and the first end wall 15 continues to swirl and maintains the vortex flow, as shown in the flow line 29 of FIGS. 4 and 5. In addition, the fluid with the protruding portion 23 positioned on the flow line flows through a gap between an outer peripheral surface of the protruding portion 23 and the peripheral side wall 13 and then flows to bend inward significantly along the peripheral surface of the protruding portion 23, as shown in the flow line 31 of FIGS. 4 and 5, or flows along the outer peripheral surface inside the protruding portion 23 to avoid the protruding portion 23 and then flows to bend inward significantly to flow to the outlet flow passage 21 in a shortcut manner, as shown in the flow line 33 of FIGS. 4 and 5. The fluid, which flows into the vortex chamber 27 from the inlet flow passage 19 to generate the vortex flow and is directed toward the outlet flow passage 21 to flow out into the outlet flow passage 21, generates a pressure loss in accordance with a flow distance. Therefore, when the fluid flows in a shortcut manner via the protruding portion 23 as described above, the length of the flow line from the inlet flow passage 19 to the outlet flow passage 21 in the vortex chamber 27 is shortened, so that the pressure loss is decreased. As a result, the flow rate is increased.

Figure 7:
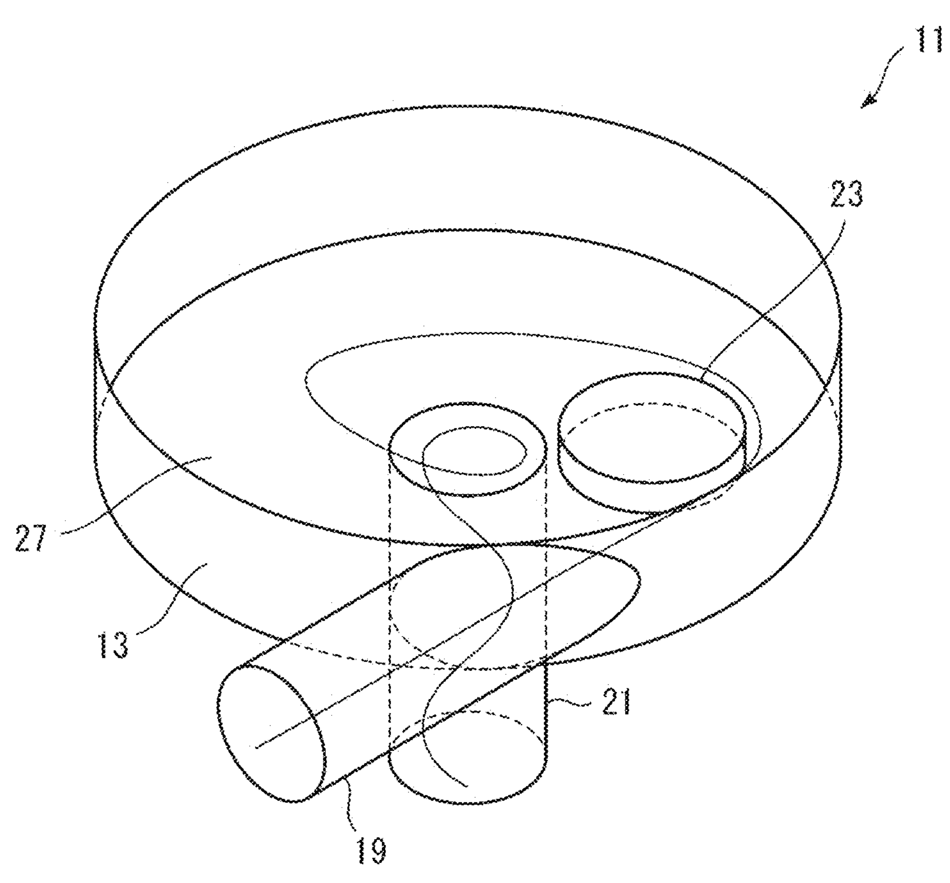
FIG. 7 is an explanatory diagram schematically showing a flow with the protruding portion slightly protruding into the vortex chamber of the vortex-type flow control valve shown in FIG. 1.
Figure 8:
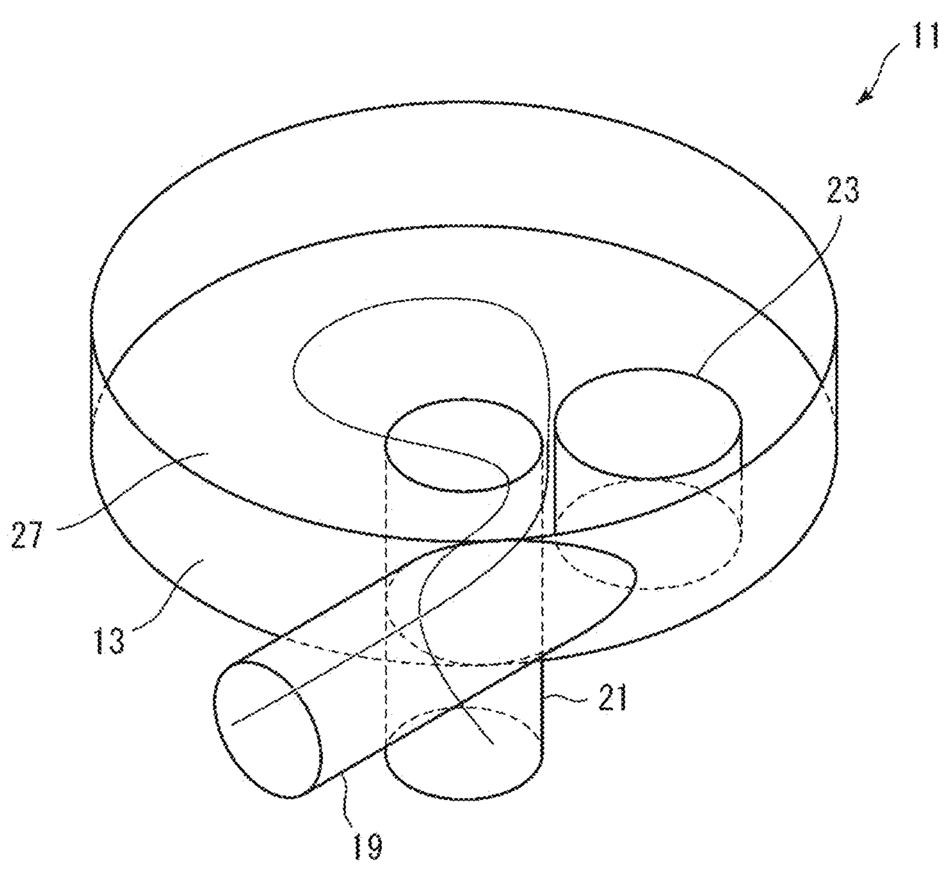
FIG. 8 is an explanatory diagram schematically showing a flow with the protruding portion protruding into the vortex chamber of the vortex-type flow control valve shown in FIG. 1 more than in FIG. 7.

When the gap between the top part of the protruding portion 23 and the first end wall 15 is reduced by moving the protruding portion 23 in a direction to bring the top part of the protruding portion 23 closer to the first end wall 15, a ratio of the fluid flowing into the outlet flow passage 21 in a shortcut manner is increased and the pressure loss of the fluid flowing from the inlet flow passage 19 to the outlet flow passage 21 is decreased as a whole, resulting in the increased flow rate of the fluid flowing out into the outlet flow passage 21. In other words, as shown in FIG. 8, the flow rate of the fluid flowing out into the outlet flow passage 21 can be increased by moving the protruding portion 23 in a direction to move the top part of the protruding portion 23 closer to the first end wall 15 to reduce the gap between the top part of the protruding portion 23 and the first end wall 15, while, as shown in FIG. 7, the flow rate of the fluid flowing out into the outlet flow passage 21 can be decreased by moving the protruding portion 23 in a direction to move the top part of the protruding portion 23 away from the first end wall 15 to increase the gap between the top part of the protruding portion 23 and the first end wall 15. The present inventor has found that, in this way, by moving the protruding portion 23 in the vortex chamber 27 so as to change the gap between the top part of the protruding portion 23 and the first end wall 15, the flow rate of the fluid flowing out into the outlet flow passage 21 can be adjusted and the function as the flow control valve can be exhibited, without providing an abutting portion at a portion in contact with the target fluid to be adjusted.

As described above, the flow rate adjustment using the protruding portion 23 can be performed as long as the fluid flowing in from the inlet flow passage 19 generates the vortex flow in the vortex chamber 27 and flows toward the outlet flow passage 21, the protruding portion 23 is arranged to block the vortex flow, and a rate at which the protruding portion 23 blocks the vortex flow can be changed by moving the protruding portion 23 in the vortex chamber 27. Therefore, the shape of the vortex chamber 27 and the positions of the inlet flow passage 19 and the outlet flow passage 21 are not limited as long as the vortex flow can be generated in the vortex chamber 27, and the position of the protruding portion 23 is not limited as long as the protruding portion 23 can block the vortex flow. Also, the cross-sectional shape of the protruding portion 23 is not limited. In other words, a wide range of configuration combinations are possible in the vortex-type flow control valve 11 according to the present invention.

Figure 9:
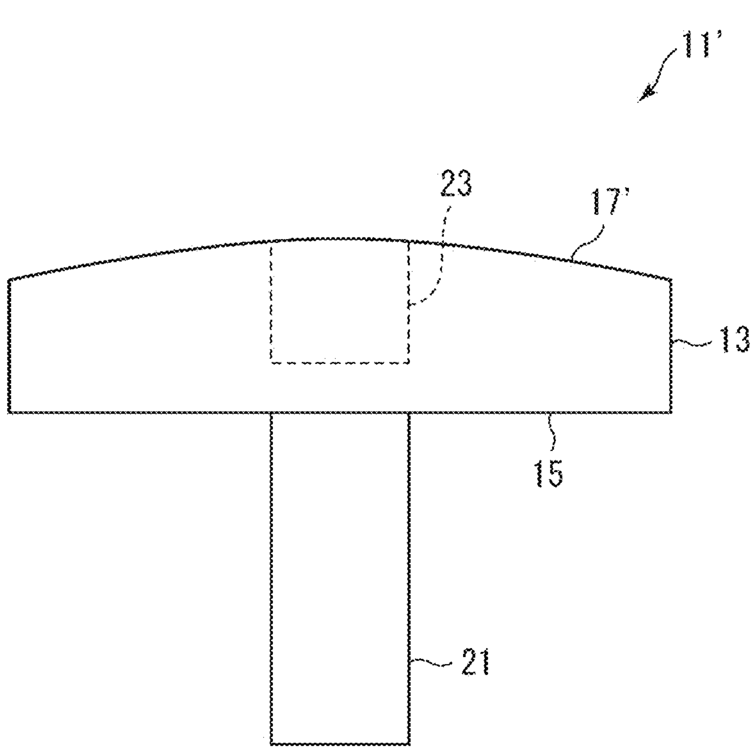
FIG. 9 is a side view showing a vortex-type flow control valve according to a second embodiment of the present invention.

For example, as in a vortex-type flow control valve 11' according to a second embodiment shown in FIG. 9, the second end wall may be constituted by a diaphragm 17', so that the protruding portion 23 can be supported in the vortex chamber 27 by the diaphragm 17' and the diaphragm 17' can be driven to move the protruding portion 23 in the vortex chamber 27, thereby changing the distance between the top part of the protruding portion 23 and the first end wall 15. In this case, the diaphragm 17' serves not only as the second ed wall, but also as the drive unit that drives the protruding portion 23. Since the diaphragm 17' only needs to be able to move the protruding portion 23 while supporting the protruding portion 23, only a portion of the second end wall 17 may be constituted by the diaphragm 17' and the diaphragm 17' may support the protruding portion 23 in the vortex chamber 27. In FIG. 9, the components common to the components of the first embodiment shown in FIG. 1 are denoted by the same reference numerals. The configuration of the vortex-type flow control valve 11' according to the second embodiment is similar to that of the vortex-type flow control valve 11 according to the first embodiment except that the protruding portion 23 is moved in the vortex chamber 27 by the diaphragm 17' instead of the drive unit 25, the operation of the vortex-type flow control valve 11' according to the second embodiment is also similar to that of the vortex-type flow control valve 11 according to the first embodiment, in that the flow rate is adjusted by changing the distance (gap) between the first end wall 15 and the top part of the protruding portion 23. Therefore, the detailed description of the configuration and the operation will be omitted here.

EXAMPLES

Figure 1:
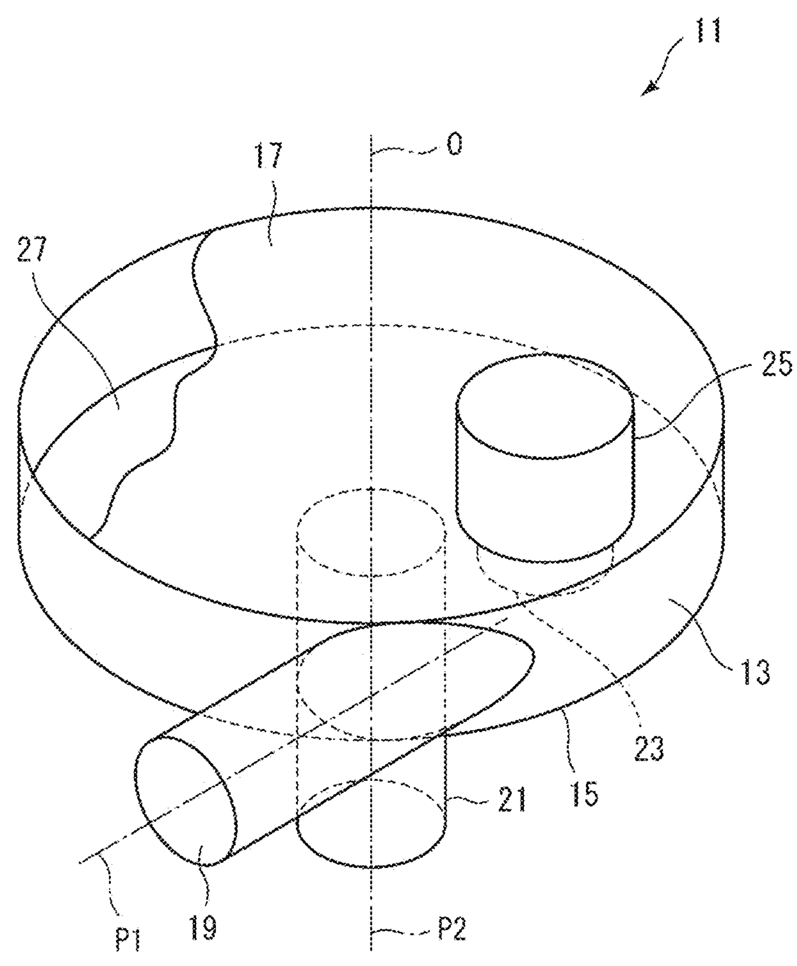
FIG. 1 is a partially broken perspective view showing an overall configuration of a vortex-type flow control valve according to a first embodiment of the present invention with a part being broken off so that the interior thereof can be seen.

The following describes relationships between the length of the protruding portion 23, the position of the protruding portion 23, the shape of the protruding portion 23, the position of the inlet flow passage 19, the position of the outlet flow passage 21, etc., and the flow rate or a flow rate change amount of the fluid, which were obtained by an experiment or numerical simulation using a vortex-type flow control valve having the same configuration as the vortex-type flow control valve 11 according to the first embodiment shown in FIG. 1. In the following description, for ease of understanding, the respective components of the vortex-type flow control valve used in the experiment or the numerical simulation are denoted by the same reference numerals as in the vortex-type flow control valve 11.

Figure 10A:
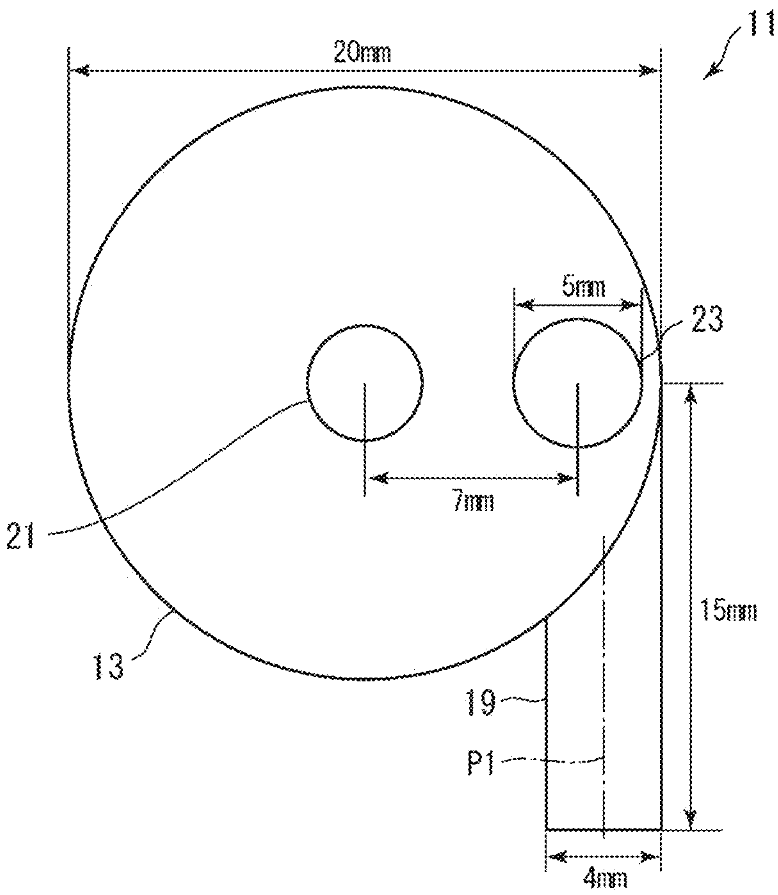
FIG. 10A is an explanatory diagram for illustrating a configuration and dimensions of a vortex-type flow control valve used in an experiment, and shows the vortex-type flow control valve with an upper end wall (second end wall) removed, as viewed from above.
Figure 10B:
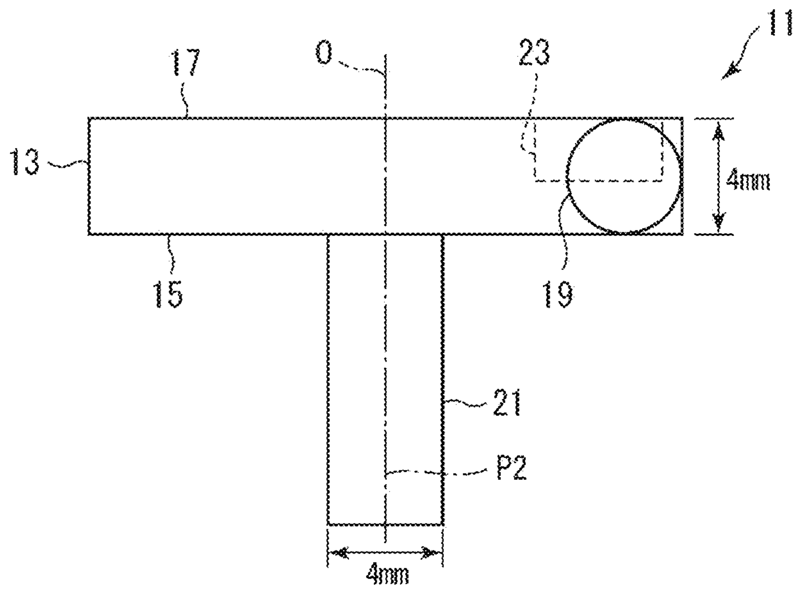
FIG. 10B is an explanatory diagram for illustrating the configuration and the dimensions of the vortex-type flow control valve used in the experiment, and shows the vortex-type flow control valve as viewed from a side.
Figure 11:
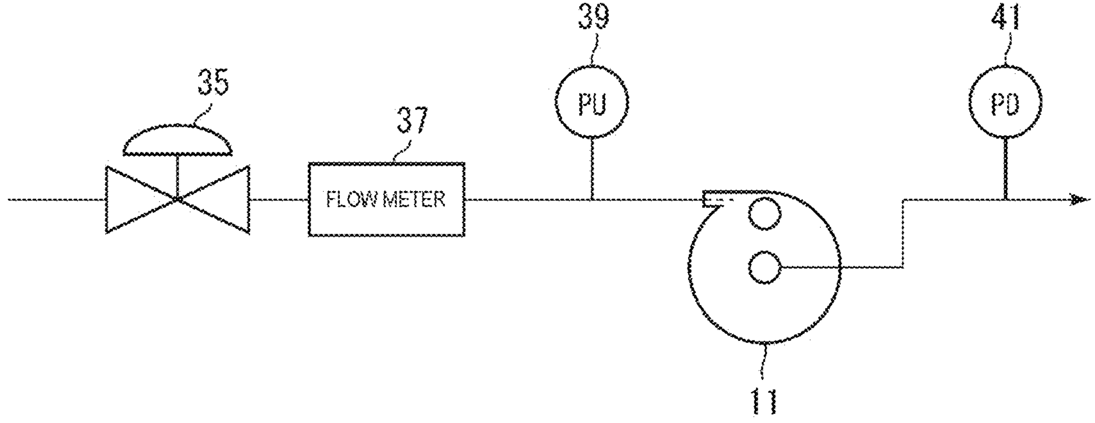
FIG. 11 is a piping diagram showing an arrangement of the vortex-type flow control valve, a measurement device, and an adjustment device used in the experiment.

First, a relationship between the length of the protruding portion 23 and a flow rate Q of the fluid obtained by the experiment using the actual produced vortex-type flow control valve 11 will be described. As shown in FIGS. 10A and 10B, in the vortex-type flow control valve 11 used in the experiment, the vortex chamber 27 has a cylindrical shape with a diameter of 20 mm and a height of 4 mm, the inlet flow passage 19 having a circular tube shape with a diameter of 4 mm and a length of 15 mm is connected to the peripheral side wall 13 so as to extend in a tangential direction, and the outlet flow passage 21 having a circular tube shape with a diameter of 4 mm and a length of 10 mm is connected to the first end wall 15 such that the outlet flow passage 21 extends along the vortex chamber central axis O and the outlet flow passage central axis P2 thereof extends to pass through the center of the first end wall 15. The protruding portion 23 has a circular column shape with a diameter of 5 mm and is arranged at a position deviated by 7 mm from the center of the vortex chamber 27 toward the inlet flow passage 19 in a direction perpendicular to the inlet flow passage central axis P1 of the inlet flow passage 19. As shown in FIG. 11, a differential pressure between an upstream pressure PU and a downstream pressure PD of the vortex-type flow control valve 11 was adjusted by a pressure adjustment valve 35 disposed upstream of the vortex-type flow control valve 11, the flow rate was measured by a flow meter 37 disposed upstream of the vortex-type flow control valve 11 (specifically, downstream of the pressure adjustment valve 35) while changing the length of the protruding portion 23 of the vortex-type flow control valve 11, and the upstream pressure PU and the downstream pressure PD were measured by an upstream pressure gauge 39 and a downstream pressure gauge 41 located upstream and downstream of the vortex-type flow control valve 11, respectively.

Figure 12:
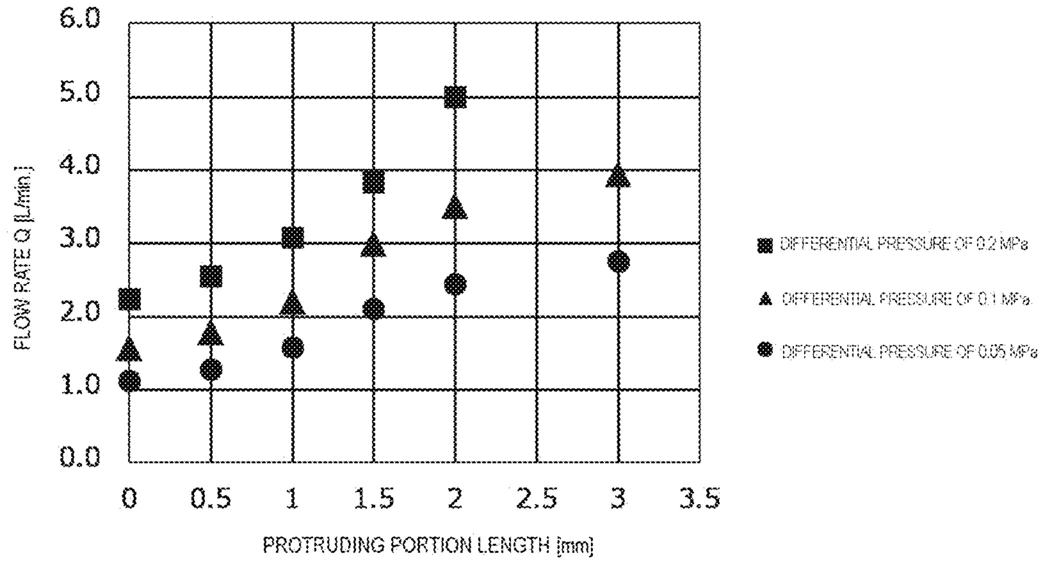
FIG. 12 is a graph plotting measurement results of a relationship between a length of a protruding portion and a flow rate when a differential pressure between an upstream pressure and a downstream pressure was changed, which measurement results were obtained through the experiments using the vortex-type flow control valve shown in FIGS. 10A and 10B.

FIG. 12 is a graph plotting the relationship between the length (mm) of the protruding portion 23 and the flow rate Q (L/min.) obtained by the experiment. In FIG. 12, a symbol "•" indicates a relationship between the length (mm) of the protruding portion 23 and the flow rate Q (L/min.) when the differential pressure between the upstream pressure PU and the downstream pressure PD is 0.05 MPa, a symbol "▲" indicates a relationship between the length (mm) of the protruding portion 23 and the flow rate Q (L/min.) when the differential pressure is 0.1 MPa, and a symbol "■" indicates a relationship between the length (mm) of the protruding portion 23 and the flow rate Q (L/min.) when the differential pressure is 0.2 MPa. As can be seen from FIG. 12, correlations are established between the length of the protruding portion 23 and the flow rate Q under all differential pressure conditions, and the flow rate Q is larger as the protruding portion 23 is longer. Therefore, it was confirmed that the flow rate Q could be changed by changing the length of the protruding portion 23 to be thereby adjusted and controlled. It was also confirmed that the flow rate Q was larger as the differential pressure was larger.

Next, an analysis result obtained by the numerical simulation (hereinafter, simply referred to as "simulation") will be described. In the following description, unless otherwise specified, the simulation was performed under the condition where the vortex chamber 27 had a circular cylindrical shape with a diameter of 20 mm and a height of 4 mm, the inlet flow passage 19 having a circular pipe shape with a diameter of 4 mm was connected to the peripheral side wall 13 such that the inlet flow passage central axis P1 extended through a position away from the center of the vortex chamber 27 by 7.5 mm and a right end of the inlet flow passage 19 in the drawing extending to pass through the center of the vortex chamber 27 was located away from a line perpendicular to the inlet flow passage central axis P1 by 15 mm, and the outlet flow passage 21 having a circular pipe shape with a diameter of 4 mm and a length of 10 mm was connected to the first end wall 15 such that the outlet flow passage 21 extended along the vortex chamber central axis O and the outlet flow passage central axis P2 extended to pass through the center of the first end wall 15.

Figure 13:
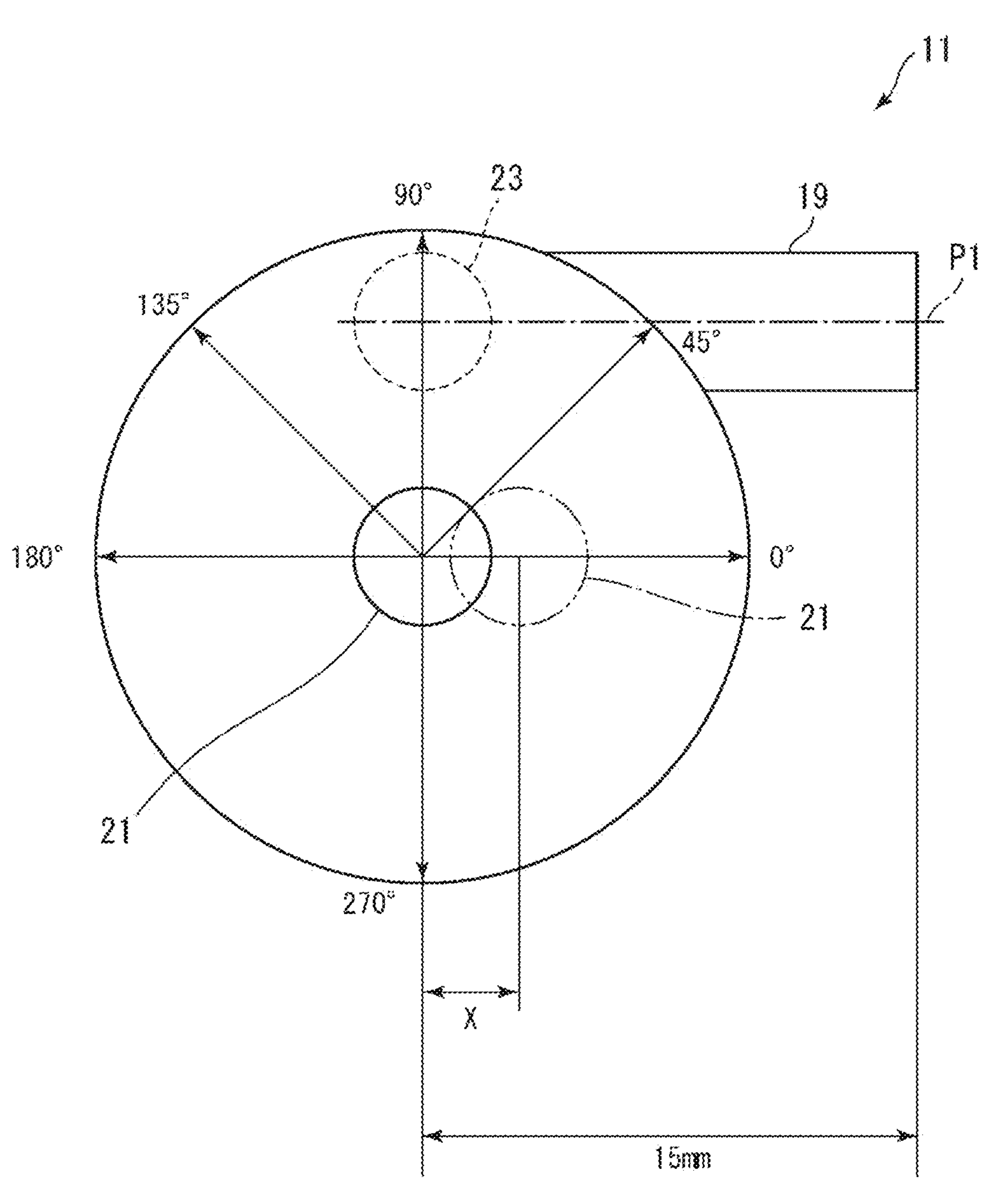
FIG. 13 is an explanatory diagram for illustrating a definition of positions of the protruding portion and an outlet flow passage of the vortex-type flow control valve in a numerical simulation, and shows the vortex-type flow control valve with the upper end wall (second end wall) removed, as viewed from above.

First, an influence of the position of the protruding portion 23 in the vortex chamber 27 was checked by the simulation. Here, the protruding portion 23 was assumed to have a circular column shape with a diameter of 4 mm and was provided to be arranged at positions where the central axis thereof was deviated from the center of the vortex chamber 27 toward the peripheral side wall 13 by various distances (3.5 mm, 5.5 mm, and 7.5 mm) at various angular positions (0°, 45°, 90°, 135°, 180°, and 270°), and the change amount of the flow rate Q (hereinafter, referred to as "flow rate difference ΔQ") was obtained by changing the length of the protruding portion 23 in a range of 0.5 mm to 3.5 mm. As shown in FIG. 13, the "angular position" of the protruding portion 23 is defined as an angle formed by an axis extending from the center of the vortex chamber 27 so as to pass through the center of the protruding portion 23, counter-clockwise around the center of the vortex chamber 27, with respect to an axis of 0°, which axis of 0° is defined as a direction of an axis extending parallel to the inlet flow passage central axis P1 and through the center of the vortex chamber 27 toward a side closer to the inlet flow passage 19.

Figure 14:
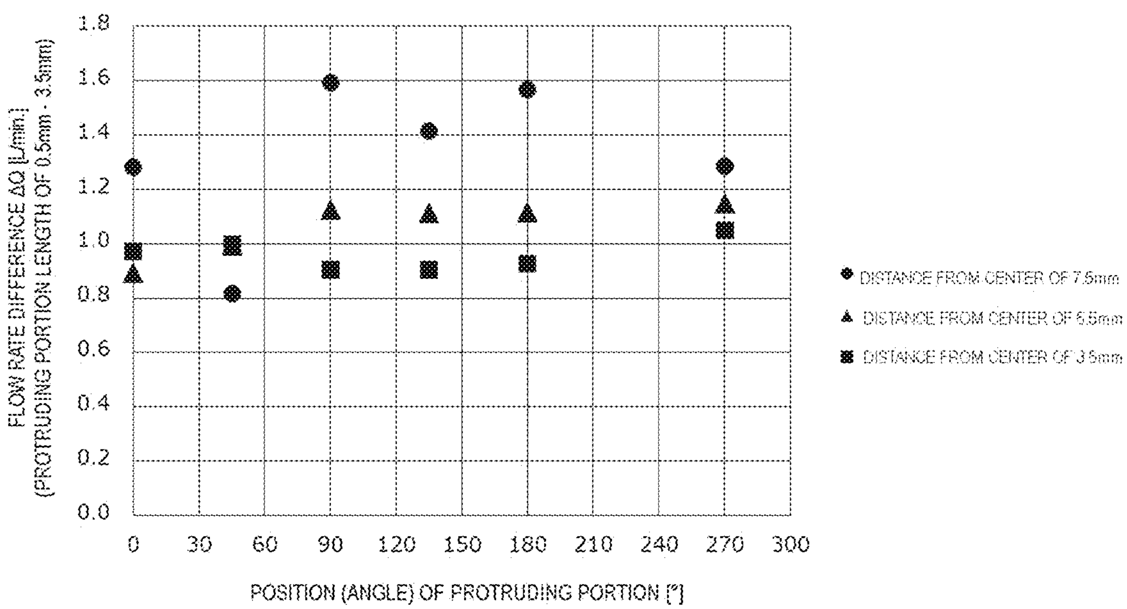
FIG. 14 is a graph plotting a relationship between the position of the protruding portion and a flow rate difference ΔQ (change amount of the flow rate into the outlet flow passage) when the length of the protruding portion was changed in a range of 0.5 mm to 3.5 mm, which relationship was obtained by numerical simulation using the vortex-type flow control valve shown in FIG. 13.

FIG. 14 is a graph plotting a relationship between the angular position (°) of the protruding portion 23 and the flow rate difference ΔQ (L/min.) obtained when the length of the protruding portion 23 was changed in a range of 0.5 mm to 3.5 mm in the simulation. In FIG. 14, a symbol "■" indicates a relationship between the angular position (°) of the protruding portion 23 and the flow rate difference ΔQ (L/min.) when the central axis of the protruding portion 23 was arranged at a position eccentric from the center of the vortex chamber 27 by a distance of 3.5 mm, a symbol "A" indicates a relationship between the angular position (°) of the protruding portion 23 and the flow rate difference ΔQ (L/min.) when the central axis of the protruding portion 23 was arranged at a position eccentric from the center of the vortex chamber 27 by a distance of 5.5 mm, and a symbol "e" indicates a relationship between the angular position (°) of the protruding portion 23 and the flow rate difference ΔQ (L/min.) when the central axis of the protruding portion 23 was arranged at a position eccentric from the center of the vortex chamber 27 by a distance of 7.5 mm.

From FIG. 14, it can be seen that, under the condition where the inlet flow passage 19 is connected to the peripheral side wall 13 so as to extend in a substantially tangential direction of the peripheral side wall 13 and the outlet flow passage 21 is connected to the first end wall 15 so as to extend from the center of the vortex chamber 27, the flow rate Q can be changed by changing the length of the protruding portion 23 to generate the flow rate difference ΔQ, regardless of the angular position of the protruding portion 23 and the distance by which the protruding portion 23 is eccentric from the center of the vortex chamber 27. In addition, it can be seen that the flow rate can be adjusted over a wider range as the protruding portion 23 is provided farther from the center of the vortex chamber 27, that is, as the protruding portion 23 is provided closer to the peripheral side wall 13 of the vortex chamber 27, and the flow rate can be adjusted over a wide range particularly when the protruding portion 23 is provided at an angular position in a range of 90° to 180°. It is presumed that this is because, in a case where the fluid flows into the vortex chamber 27 from the inlet flow passage 19 along the peripheral side wall 13 to generate the vortex flow, it is easier to achieve the effect of shortcutting the vortex flow toward the outlet flow passage 21 as the protruding portion 23 is arranged closer to the peripheral side wall 13 and closer to a starting point of the vortex flow of the fluid flowing in from the inlet flow passage 19.

Figure 15:
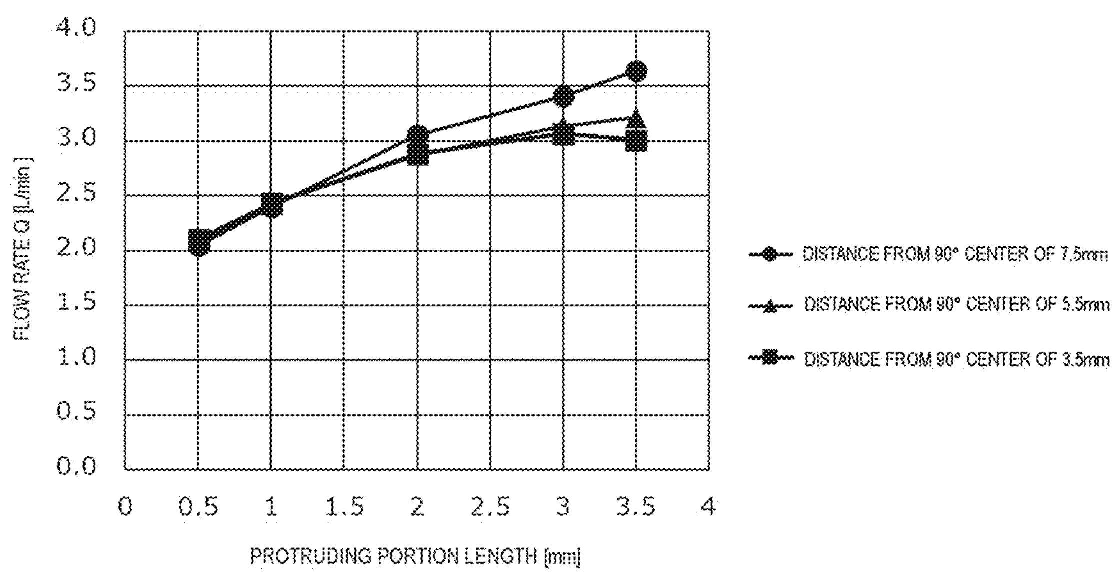
FIG. 15 is a line graph plotting a relationship between the length of the protruding portion and a flow rate Q (flow rate into the outlet flow passage) in a case where the protruding portion was arranged at an angular position of 90° and deviated from a vortex chamber center by distances of 3.5 mm, 5.5 mm, and 7.5 mm, respectively, in the numerical simulation using the vortex-type flow control valve shown in FIG. 13.
Figure 16:
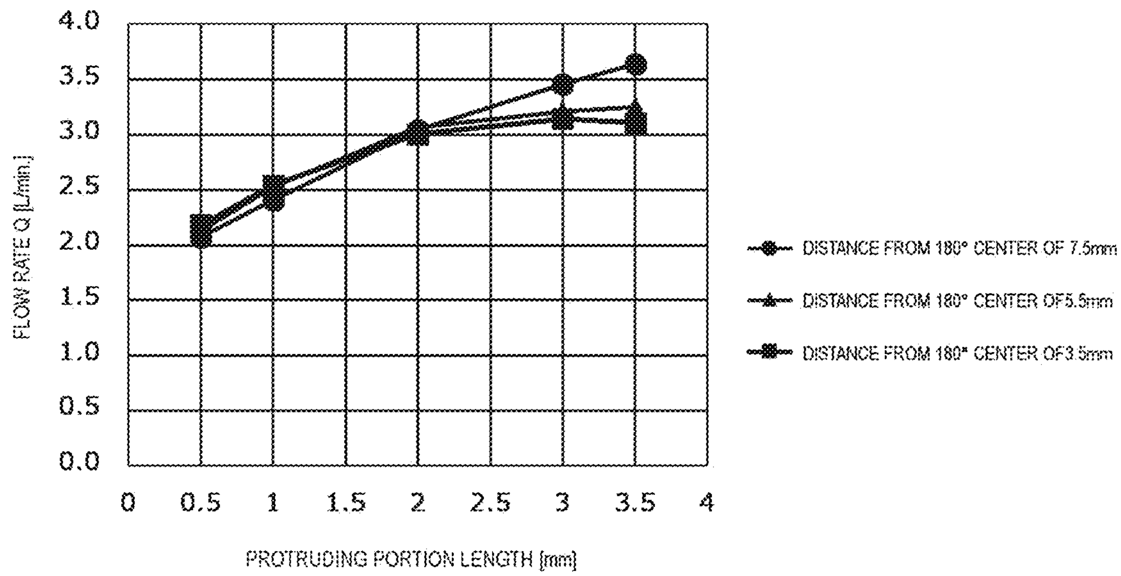
FIG. 16 is a line graph plotting a relationship between the length of the protruding portion and the flow rate Q in a case where the protruding portion was arranged at an angular position of 1800 and deviated from the vortex chamber center by distances of 3.5 mm, 5.5 mm, and 7.5 mm, respectively, in the numerical simulation using the vortex-type flow control valve shown in FIG. 13.

FIGS. 15 and 16 are line graphs plotting relationships between the length (mm) of the protruding portion 23 and the flow rate (L/min.) obtained when the length of the protruding portion 23 was changed in an range of 0.5 mm to 3.5 mm with the protruding portion 23 provided at angular positions of 90° and 1800 in the simulation, respectively. In FIG. 15, a symbol "■" indicates a relationship between the length (mm) of the protruding portion 23 and the flow rate (L/min.) when the central axis of the protruding portion 23 was deviated from the center of the vortex chamber 27 by 3.5 mm at the angular position of 90°, a symbol "▲" indicates a relationship between the length (mm) of the protruding portion 23 and the flow rate (L/min.) when the central axis of the protruding portion 23 was deviated from the center of the vortex chamber 27 by 5.5 mm at the angular position of 90°, and a symbol "•" indicates a relationship between the length (mm) of the protruding portion 23 and the flow rate (L/min.) when the central axis of the protruding portion 23 was deviated from the center of the vortex chamber 27 by 7.5 mm at the angular position of 90°. In FIG. 16, a symbol "■" indicates a relationship between the length (mm) of the protruding portion 23 and the flow rate (L/min.) when the central axis of the protruding portion 23 was deviated from the center of the vortex chamber 27 by 3.5 mm at the angular position of 180°, a symbol "A" indicates a relationship between the length (mm) of the protruding portion 23 and the flow rate (L/min.) when the central axis of the protruding portion 23 was deviated from the center of the vortex chamber 27 by 5.5 mm at the angular position of 180°, and a symbol "•" indicates a relationship between the length (mm) of the protruding portion 23 and the flow rate (L/min.) when the central axis of the protruding portion 23 was deviated from the center of the vortex chamber 27 by 7.5 mm at the angular position of 180°.

From FIGS. 15 and 16, it can be seen that, regardless of whether the protruding portion 23 is provided at the angular position of 90° or 180°, the flow rate Q is larger as the length of the protruding portion 23 is longer, and the flow rate Q is larger as the protruding portion 23 is provided farther away from the center of the vortex chamber 27. In particular, when the protruding portion 23 is spaced from the center of the vortex chamber 27 by 5.5 mm or more, a correlation between the length of the protruding portion 23 and the flow rate Q is higher. In addition, although not shown here, even in a case where the protruding portion 23 was provided at the angular positions of 0°, 45°, 135°, and 270°, respectively, the flow rate Q was larger as the length of the protruding portion 23 was longer, and it was confirmed that there was a correlation between the length of the protruding portion 23 and the flow rate Q. Therefore, under the condition where the inlet flow passage 19 is connected to the peripheral side wall 13 so as to extend in the substantially tangential direction of the peripheral side wall 13 and the outlet flow passage 21 is connected to the first end wall 15 so as to extend from the center of the vortex chamber 27, the flow rate Q can be changed by changing the length of the protruding portion 23, thereby being adjusted and controlled, regardless of the position of the protruding portion 23.

Figure 17A:
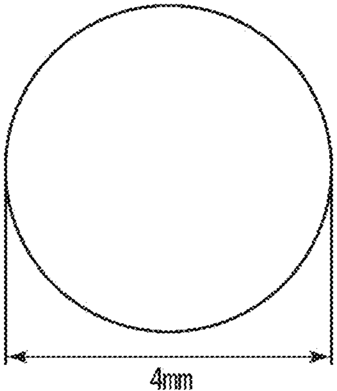
FIG. 17A is an explanatory diagram for illustrating the protruding portion of the vortex-type flow control valve used in the numerical simulation using the vortex-type flow control valve shown in FIG. 13, and shows the protruding portion having a circular cross-sectional shape (shape 1).
Figure 17B:
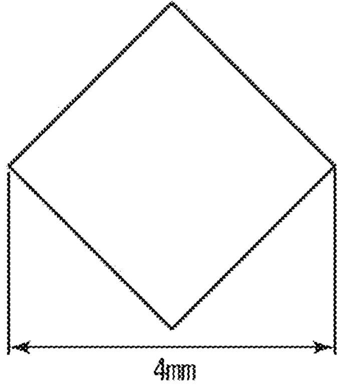
FIG. 17B is an explanatory diagram for illustrating the protruding portion of the vortex-type flow control valve used in the numerical simulation using the vortex-type flow control valve shown in FIG. 13, and shows the protruding portion having a rhombus cross-sectional shape (shape 2).

Next, an influence of the cross-sectional shape of the protruding portion 23 was checked by the simulation. Here, the simulations were performed for cases in which the protruding portions 23 having three cross-sectional shapes shown in FIGS. 17A to 17C, that is, a cross-sectional shape 1, a cross-sectional shape 2, and a cross-sectional shape 3 were used. The cross-sectional shape 1 is a circular shape having a diameter of 4 mm as shown in FIG. 17A, the cross-sectional shape 2 is a rhombus shape having a diagonal length of 4 mm as shown in FIG. 17B, and the cross-sectional shape 3 is a square shape having a side of 4 mm as shown in FIG. 17C. In the case of the cross-sectional shape 2, the protruding portion 23 was arranged in an orientation where the vortex flow first hit a corner of the rhombus shape, and in the case of the cross-sectional shape 3, the protruding portion 23 was arranged in a orientation where the vortex flow was received by the square surface.

Figure 19:
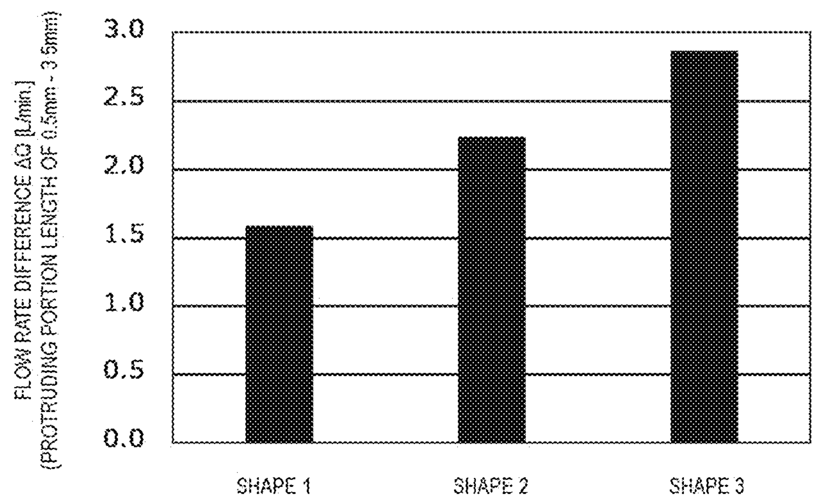
FIG. 19 is a bar graph showing a comparison result of the flow rate differences ΔQ in a case where the length of the protruding portion was changed in a range of 0.5 mm to 3.5 mm for each shape of the protruding portion under a condition where the protruding portion was arranged at the angular position of 90° and deviated from the vortex chamber center by the distance of 7.5 mm, in the numerical simulation using the vortex-type flow control valve shown in FIG. 13.

FIGS. 18 and 19 are bar graphs showing a comparison between the flow rate differences ΔQ (L/min.) obtained by the simulation when the length of the protruding portion 23 was changed in a range of 0.5 mm to 3.5 mm for each cross-sectional shape of the protruding portion 23, respectively. FIG. 18 shows a result obtained when the protruding portion 23 was provided such that the central axis thereof was deviated from the center of the vortex chamber 27 by 3.5 mm at the angular position of 90°, and FIG. 19 shows a result obtained when the protruding portion 23 was provided such that the central axis thereof was deviated from the center of the vortex chamber 27 by 7.5 mm at the angular position of 90°.

From FIGS. 18 and 19, it can be seen that, under the condition where the inlet flow passage 19 is connected to the peripheral side wall 13 so as to extend in the substantially tangential direction of the peripheral side wall 13 and the outlet flow passage 21 is connected to the first end wall 15 so as to extend from the center of the vortex chamber 27, the flow rate Q can be changed by changing the length of the protruding portion 23 to thereby generate the flow rate difference ΔQ, regardless of the cross-sectional shape of the protruding portion 23. In addition, from the comparison between the flow rate differences ΔQ depending on the position of the protruding portion 23, including a result in a case where the protruding portion 23 was deviated from the center of the vortex chamber 27 by 5.5 mm at the angular position of 90°, which is not shown here, it was found that the flow rate could be adjusted in a wider range as the protruding portion 23 was provided farther from the center of the vortex chamber 27, that is, as the protruding portion 23 was provided closer to the peripheral side wall 13 of the vortex chamber 27. As described above, it is presumed that this is because, in a case where the fluid flows into the vortex chamber 27 from the inlet flow passage 19 along the peripheral side wall 13 to generate the vortex flow, it is easier to obtain the effect of shortcutting the vortex flow toward the outlet flow passage 21 as the protruding portion 23 is arranged near the peripheral side wall 13 and closer to a starting point of the vortex flow of the fluid flowing in from the inlet flow passage 19. Further, from the comparison between the flow rate differences ΔQ depending on the position of the protruding portion 23, including a result in a case where the protruding portion 23 was deviated from the center of the vortex chamber 27 by 5.5 mm at the angular position of 90°, which is not shown here, it was found that the flow rate difference ΔQ was larger in the shape 2 (rhombus cross section) than in the shape 1 (circular cross section) and the flow rate difference ΔQ was further larger in the shape 3 (square cross section) than in the shape 2. It is presumed that this is because the effect of shortcutting the vortex flow toward the outlet flow passage 21 is more easily obtained in a case where the protruding portion 23 having a rhombus cross section is arranged in an orientation where the corner thereof is first applied to the vortex flow or the protruding portion 23 having a square cross section is arranged so as to receive the vortex flow on the surface than in a case where the protruding portion 23 having a circular cross section is arranged. In addition, it is presumed that, in a case where the vortex flow hits the surface, the vortex flow is also shortcut toward the outlet flow passage 21 even in a case of a rectangular shape or a plate shape, and the effect of increasing the flow rate difference ΔQ can be obtained.

Figure 20:
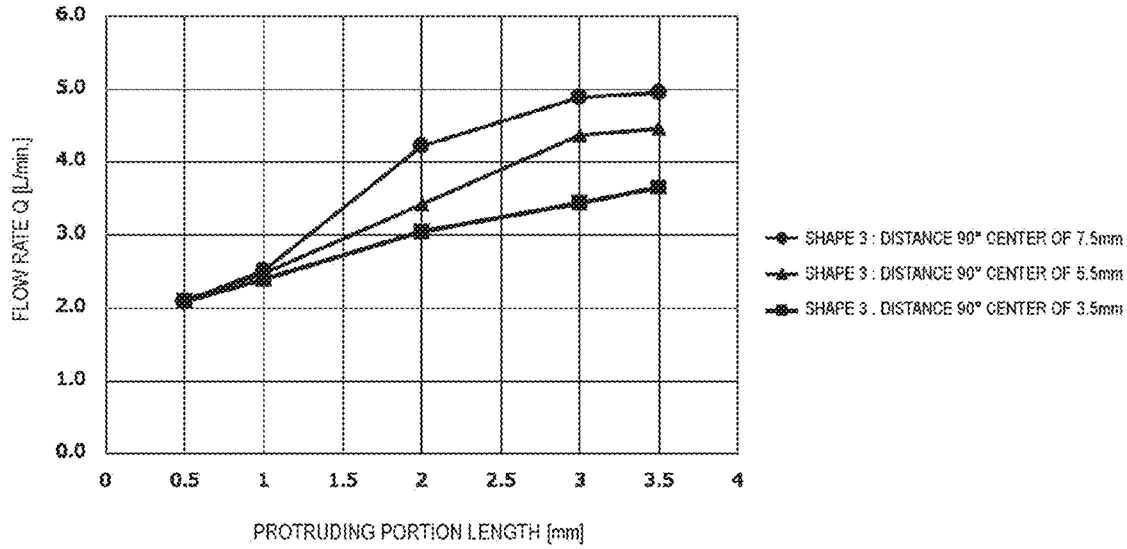
FIG. 20 is a line graph plotting a relationship between the length of the protruding portion and the flow rate Q in a case where the protruding portion having a cross section of the shape 3 was arranged at the angular position of 90° and deviated from the vortex chamber center by 3.5 mm, 5.5 mm, and 7.5 mm, respectively, in the numerical simulation using the vortex-type flow control valve shown in FIG. 13.

FIG. 20 is a line graph plotting a relationship between the length (mm) of the protruding portion 23 and the flow rate Q (L/min.) obtained when the length of the protruding portion 23 was changed in a range of 0.5 mm to 3.5 mm with the protruding portion 23 having a cross section of the shape 3 at the angular position of 90° in the simulation. In FIG. 20, a symbol "■" indicates a relationship between the length (mm) of the protruding portion 23 and the flow rate (L/min.) when the central axis of the protruding portion 23 was deviated from the center of the vortex chamber 27 by 3.5 mm at the angular position of 90°, a symbol "▲" indicates a relationship between the length (mm) of the protruding portion 23 and the flow rate (L/min.) when the central axis of the protruding portion 23 was deviated from the center of the vortex chamber 27 by 5.5 mm at the angular position of 90°, and a symbol "•" indicates a relationship between the length (mm) of the protruding portion 23 and the flow rate (L/min.) when the central axis of the protruding portion 23 was deviated from the center of the vortex chamber 27 by 7.5 mm at the angular position of 90°.

From FIG. 20, it can be seen, even in a case where the cross-sectional shape of the protruding portion 23 is a square shape, as in a case where the cross-sectional shape of the protruding portion 23 is a circular shape, the flow rate Q is larger as the length of the protruding portion 23 is longer and as the protruding portion 23 is provided farther from the center of the vortex chamber 27. Although not shown here, even in a case where the cross-sectional shape of the protruding portion 23 is a rhombus shape, similarly, the flow rate Q is larger as the length of the protruding portion 23 is longer and as the protruding portion 23 is provided farther away from the center of the vortex chamber 27. Therefore, under the condition where the inlet flow passage 19 is connected to the peripheral side wall 13 so as to extend in the substantially tangential direction of the peripheral side wall 13 and the outlet flow passage 21 is connected to the first end wall 15 so as to extend from the center of the vortex chamber 27, the flow rate Q can be changed by changing the length of the protruding portion 23, thereby being adjusted and controlled, regardless of the cross-sectional shape of the protruding portion 23.

Next, an influence of the position of the inlet flow passage 19 in the vortex chamber 27 was checked by the simulation. The position of the inlet flow passage 19 was defined as a ratio (%) of a distance between the center of the vortex chamber 27 and the inlet flow passage central axis P1 of the inlet flow passage 19 to a value obtained by dividing a difference between the diameter of the vortex chamber 27 having the circular cylindrical shape and the diameter of the inlet flow passage 19 having the circular pipe shape by 2. This is because the inlet flow passage 19 can only be provided as close to the peripheral side wall 13 as a position where the inlet flow passage central axis P1 is spaced from the peripheral side wall 13 by a radius of the inlet flow passage 19. Here, the simulations were performed for cases where the positions of the inlet flow passage 19 with respect to the outlet flow passage 21 were 0%, 25%, 50%, 75%, 94%, and 100% under the condition where the protruding portion 23 having a diameter of 4 mm and a circular column shape was provided at the angular position of 90° and the outlet flow passage 21 was connected to the first end wall 15 so as to extend from the center of the vortex chamber 27.

Figure 21:
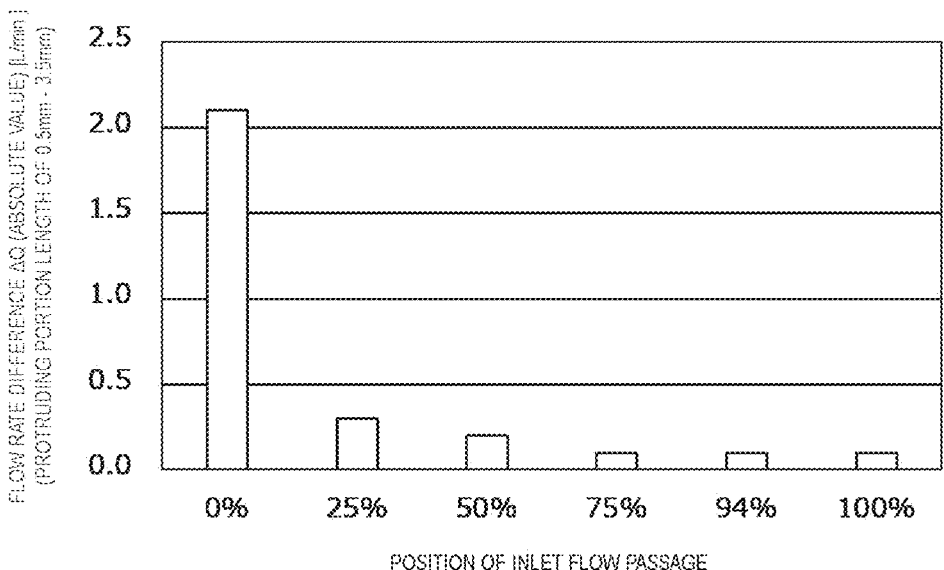
FIG. 21 is a bar graph showing a comparison result of the flow rate differences ΔQ in a case where the length of the protruding portion was changed in a range of 0.5 mm to 3.5 mm for each position of the inlet flow passage changed with respect to the vortex chamber center under a condition where the protruding portion having the cross section of the shape 1 was arranged at the vortex chamber center in the numerical simulation using the vortex-type flow control valve shown in FIG. 13.
Figure 22:
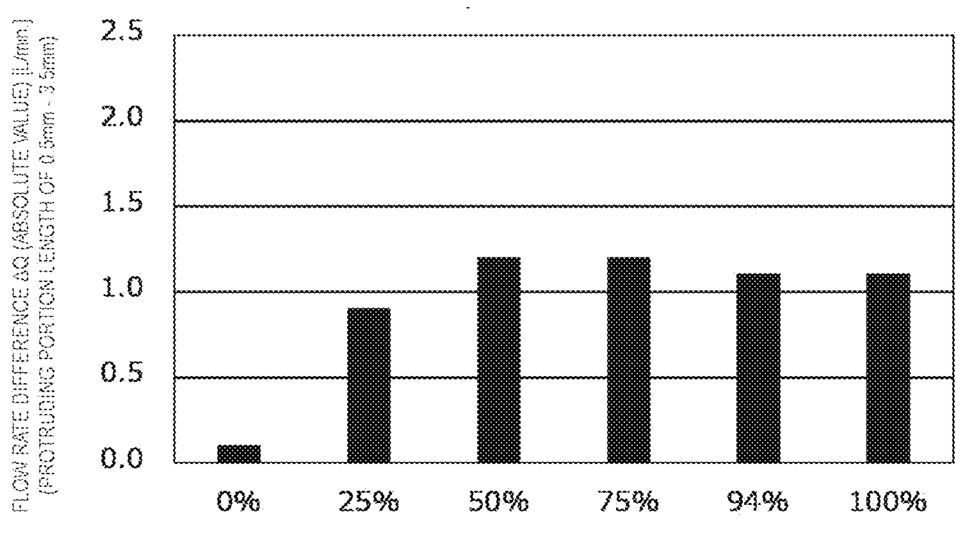
FIG. 22 is a bar graph showing a comparison result of the flow rate differences ΔQ in a case where the length of the protruding portion was changed in a range of 0.5 mm to 3.5 mm for each position of the inlet flow passage changed with respect to the vortex chamber center under a condition where the protruding portion having the cross section of the shape 1 was arranged at the angular position of 90° and deviated from the vortex chamber center by 5.5 mm, in the numerical simulation using the vortex-type flow control valve shown in FIG. 13.
Figure 23:
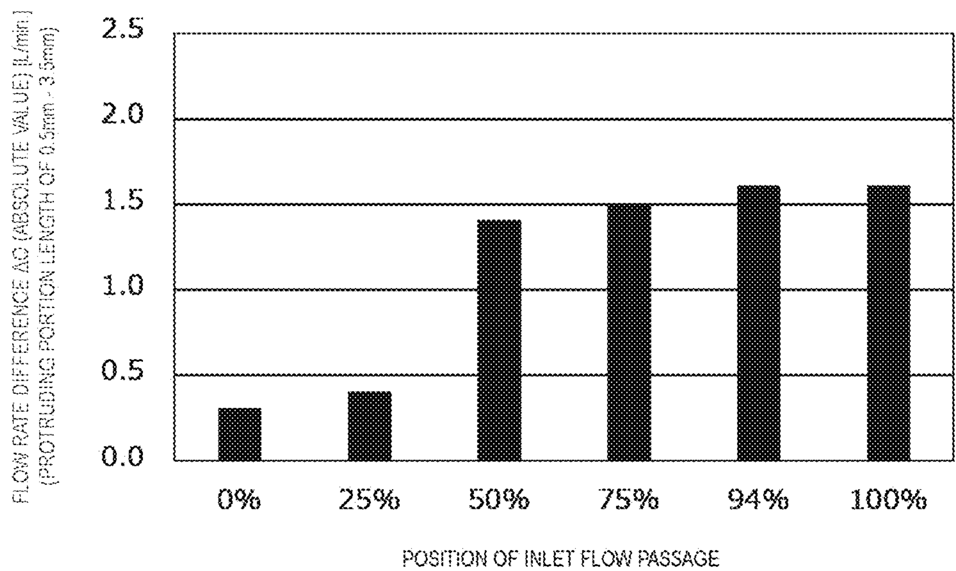
FIG. 23 is a bar graph showing a comparison result of the flow rate differences ΔQ in a case where the length of the protruding portion was changed in a range of 0.5 mm to 3.5 mm for each position of the inlet flow passage changed with respect to the vortex chamber center under a condition where the protruding portion having the cross section of the shape 1 was arranged at the angular position of 90° and deviated from the vortex chamber center by 7.5 mm, in the numerical simulation using the vortex-type flow control valve shown in FIG. 13.

FIGS. 21 to 23 are bar graphs showing a comparison between the flow rate differences ΔQ (L/min.) obtained by changing the length of the protruding portion 23 in a range of 0.5 mm to 3.5 mm when the position of the inlet flow passage 19 with respect to the outlet flow passage 21 was changed to 0%, 25%, 50%, 75%, 94%, and 100% for various positions of the protruding portion 23. FIG. 21 shows a result obtained when the protruding portion 23 was provided such that the central axis was arranged at the center of the vortex chamber 27, FIG. 22 shows a result obtained when the protruding portion 23 was provided such that the central axis was arranged at the angular position of 90° and deviated from the center of the vortex chamber 27 by 5.5 mm, and FIG. 23 shows a result obtained when the protruding portion 23 was provided such that the central axis was arranged at the angular position of 90° and deviated from the center of the vortex chamber 27 by 7.5 mm. In FIGS. 21 to 23, white bars represent that the flow rate is relatively higher when the protruding portion 23 is short and that the flow rate is relatively lower when the protruding portion 23 is long, and black bars represent that the flow rate is relatively lower when the protruding portion 23 is short and that the flow rate is relatively higher when the protruding portion 23 is long.

With reference to FIGS. 21 to 23, it can be seen that, under the condition where the outlet flow passage 21 is connected to the first end wall 15 so as to extend from the center of the vortex chamber 27, in a case where the protruding portion 23 is located at the position eccentric from the center of the vortex chamber 27, the flow rate Q can be changed by changing the length of the protruding portion 23 to generate a significant flow rate difference ΔQ, regardless of the position of the inlet flow passage 19, except for a case where the inlet flow passage central axis P1 of the inlet flow passage 19 extends to pass through the center of the vortex chamber 27 (that is, a case where the position of the inlet flow passage 19 is 0%). It is presumed that this is because, in a case where the inlet flow passage central axis P1 of the inlet flow passage 19 does not pass through the center of the vortex chamber 27, the fluid flowing in from the inlet flow passage 19 will generate a vortex flow in the vortex chamber 27, and the protruding portion 23 is provided at a position eccentric from the center of the vortex chamber 27, so that an effect of changing a direction of the vortex flow by the protruding portion 23 to allow the fluid to flow to the outlet flow passage 21 in a shortcut manner is obtained. Therefore, in order to adjust the flow rate Q by the length of the protruding portion 23, it is necessary to provide the inlet flow passage 19 such that the inlet flow passage central axis P1 does not pass through the center of the vortex chamber 27. On the other hand, as can be seen from FIG. 21, when the protruding portion 23 is provided at the center of the vortex chamber 27 (that is, when the protruding portion 23 is provided at a position eccentric from the center of the vortex chamber 27 by a distance of 0 mm at the angular position of 90°), the flow rate is lower as the protruding portion 23 is longer, regardless of the position of the protruding portion 23. It is presumed that this is because, under the condition where the outlet flow passage 21 is connected to the first end wall 15 so as to extend from the center of the vortex chamber 27, when the protruding portion 23 is provided at the center of the vortex chamber 27, the protruding portion 23 is to be arranged opposite to the outlet flow passage 21, so that a flow passage area for the fluid flowing into the outlet flow passage 21 is smaller as the protruding portion 23 is longer. It is presumed that, in a case where the protruding portion 23 partially overlaps the outlet flow passage 21 when the vortex chamber 27 is viewed in a direction of the vortex chamber central axis O, similarly, the flow rate is lower as the protruding portion 23 is longer.

From FIGS. 22 and 23, it could be seen that, under the condition where the outlet flow passage 21 was connected to the first end wall 15 so as to extend from the center of the vortex chamber 27, when the protruding portion 23 was provided at a position eccentric from the center of the vortex chamber 27 by 7.5 mm, that is, when the protruding portion 23 was provided at a position substantially adjacent to the peripheral side wall 13 of the vortex chamber 27, by providing the inlet flow passage 19 at a position in a range of 50% to 100%, that is, by providing the inlet flow passage 19 such that the inlet flow passage central axis P1 was closer to the peripheral side wall 13 side than the center side of the vortex chamber 27, the flow rate could be adjusted over a wider range. It is presumed that this is because the effect of shortcutting the vortex flow is greater when the protruding portion 23 is provided near the peripheral side wall 13 of the vortex chamber 27 and the inlet flow passage central axis P1 of the inlet flow passage 19 is located near the peripheral side wall 13 of the vortex chamber 27.

Finally, an influence of the position of the outlet flow passage 21 in the vortex chamber 27 was chacked by the simulation. As shown in FIG. 13, the position of the outlet flow passage 21 was defined by an angular position defined in the same way as the angular position of the protruding portion 23 and a distance X from the center of the vortex chamber 27. For example, the position of the outlet flow passage 21 shown by a two-dot chain line in FIG. 13 is represented as a position away from the center of the vortex chamber by a distance of X at the angular position of 0°. In the simulation, the inlet flow passage 19 was provided such that the inlet flow passage central axis P1 was arranged at a position away from the center of the vortex chamber 27 by the distance of 8 mm, and the protruding portion 23 having a diameter of 4 mm and a circular column shape was provided at the angular position of 90° and deviated from the center of the vortex chamber 27 by the distance of 7.5 mm.

Figure 24:
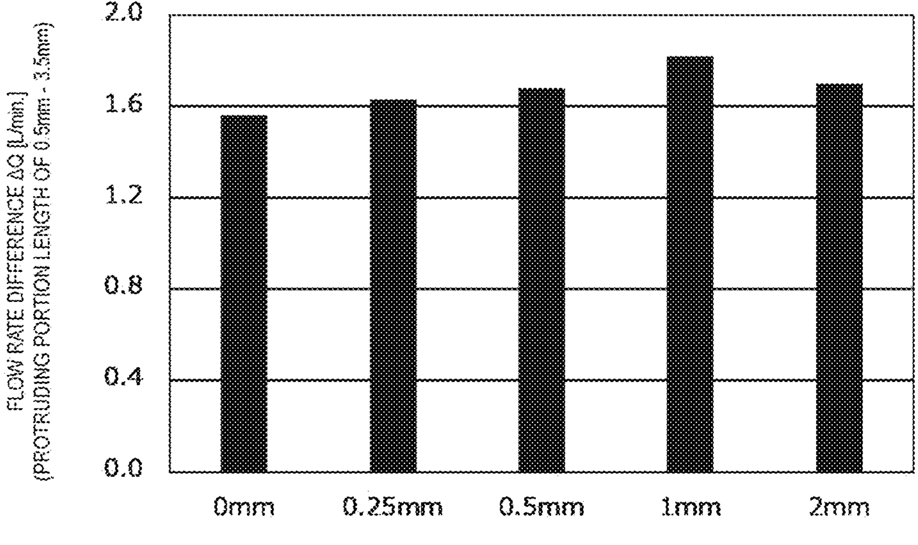
FIG. 24 is a bar graph showing a comparison result of the flow rate differences ΔQ in a case where the length of the protruding portion was changed in a range of 0.5 mm to 3.5 mm for each position (distance) of the outlet flow passage changed with respect to the vortex chamber center at the angular position of 90° under a condition where the protruding portion having the cross section of the shape 1 was arranged at the angular position of 90° and deviated from the vortex chamber center by 7.5 mm, in the numerical simulation using the vortex-type flow control valve shown in FIG. 13.
Figure 25:
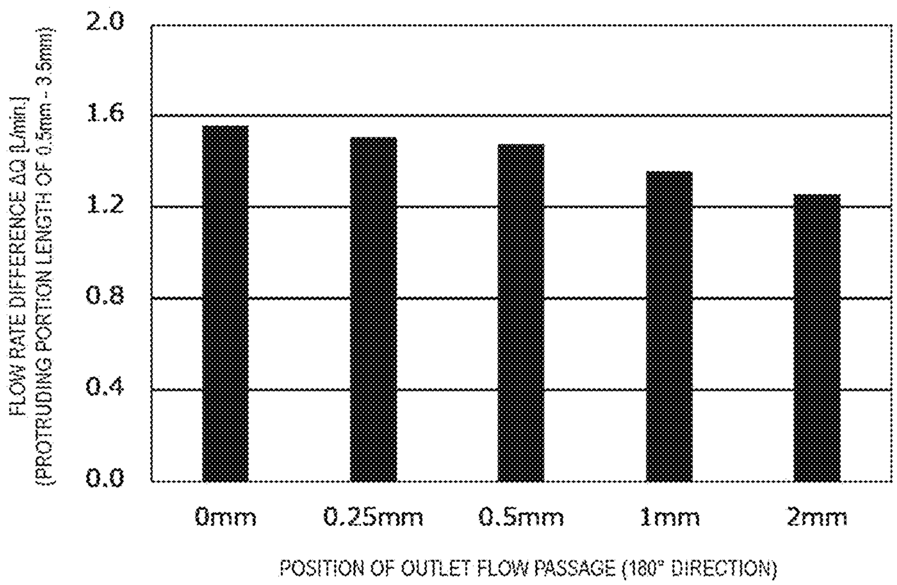
FIG. 25 is a bar graph showing a comparison result of the flow rate differences ΔQ in a case where the length of the protruding portion was changed in a range of 0.5 mm to 3.5 mm for each position (distance) of the outlet flow passage changed with respect to the vortex chamber center at the angular position of 1800 under a condition where the protruding portion having the cross section of the shape 1 was arranged at the angular position 90° and deviated from the vortex chamber center by 7.5 mm, in the numerical simulation using the vortex-type flow control valve shown in FIG. 13.

FIGS. 24 and 25 are bar graphs showing a comparison between the flow rate differences ΔQ (L/min.) obtained by changing the length of the protruding portion in a range of 0.5 mm to 3.5 mm when the distance X of the outlet flow passage 21 from the center of the vortex chamber 27 was changed to 0 mm, 0.25 mm, 0.5 mm, 1 mm, and 2 mm for different angular positions of the outlet flow passage 21. FIG. 24 shows a result obtained in a case where the outlet flow passage 21 was provided at the angular position of 90°, and FIG. 25 shows a result obtained in a case where the outlet flow passage 21 was provided at the angular position of 180°.

From FIGS. 24 and 25, it can be seen that, under the condition where the inlet flow passage 19 is provided such that the inlet flow passage central axis P1 is arranged at a position away from the center of the vortex chamber 27 by the distance of 8 mm and the protruding portion 23 having a diameter of 4 mm and a circular column shape is provided at the angular position of 90° and deviated from the center of the vortex chamber 27 by the distance of 7.5 mm, the flow rate Q can be changed by changing the length of the protruding portion 23 to thereby generate the flow rate difference ΔQ, regardless of the position of the outlet flow passage 21. In other words, the flow rate Q can be adjusted by changing the length of the protruding portion 23, regardless of the outlet flow passage 21. In addition, from the comparison between the flow rate differences ΔQ depending on the position of the outlet flow passage 21, including the results in the cases where the outlet flow passage 21 was provided at the angular position of 0° and the angular position of 270°, which are not shown here, it was found that, when the outlet flow passage 21 was provided at the angular position of 90° and deviated from the center of the vortex chamber 27, the flow rate could be adjusted over a wider range. It is presumed that this is because the protruding portion 23 is also provided at the angular position of 90°, which makes it easier for the vortex flow bent by the protruding portion 23 to reach the outlet flow passage 21 more quickly and to obtain the effect of shortening the vortex flow toward the outlet flow passage 21.

Figure 26:
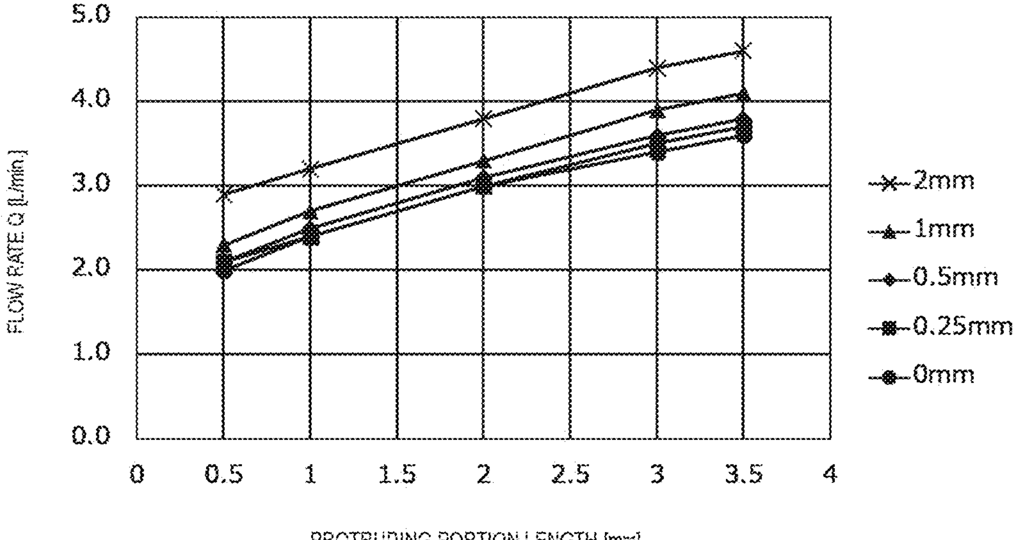
FIG. 26 is a line graph plotting a relationship between the length of the protruding portion and the flow rate Q in a case where the position (distance) of the outlet flow passage was changed at the angular position of 90° with respect to the vortex chamber center by 0 mm, 0.25 mm, 0.5 mm, 1 mm, and 2 mm, respectively, under a condition where the protruding portion having the cross section of the shape 1 was arranged at the angular position of 90° and deviated from the vortex chamber center by 7.5 mm, in the numerical simulation using the vortex-type flow control valve shown in FIG. 13.
Figure 27:
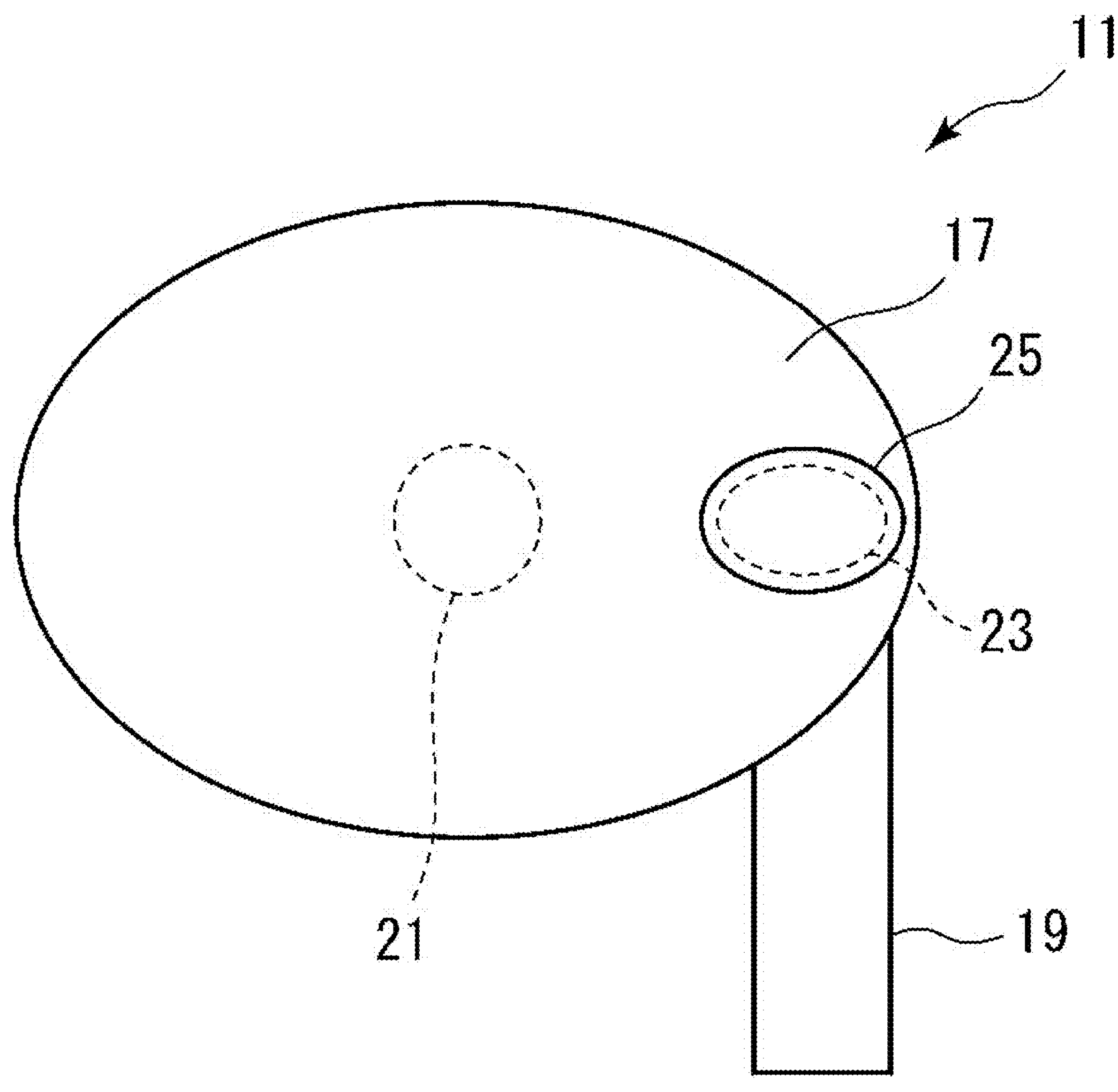
FIG. 27 is a plan view showing a vortex-type flow control valve according to another embodiment, as viewed from the second end wall side, wherein the first end wall and the second end wall have an elliptical shape, and the protruding portion has an elliptical cross section.

FIG. 26 is a line graph plotting a relationship between the length (mm) of the protruding portion 23 and the flow rate Q (L/min.) obtained when the length of the protruding portion 23 was changed in a range of 0.5 mm to 3.5 mm in a case where the outlet flow passage 21 was provided at the angular position of 90° and deviated from the center of the vortex chamber 27 in the simulation. In FIG. 26, a symbol "•" indicates a relationship between the length (mm) of the protruding portion 23 and the flow rate (L/min.) in a case where the outlet flow passage 21 was provided at the center of the vortex chamber 27, a symbol "■" indicates a relationship between the length (mm) of the protruding portion 23 and the flow rate (L/min.) in a case where the outlet flow passage 21 was provided at the angular position of 90° and deviated from the center of the vortex chamber 27 by 0.25 mm, a symbol "◆" indicates a relationship between the length (mm) of the protruding portion 23 and the flow rate (L/min.) in a case where the outlet flow passage 21 was provided at the angular position of 90° and deviated from the center of the vortex chamber 27 by 0.5 mm, a symbol "▲" indicates a relationship between the length (mm) of the protruding portion 23 and the flow rate (L/min.) in a case where the outlet flow passage 21 was provided at the angular position of 90° and deviated from the center of the vortex chamber 27 by 1 mm, and a symbol "*" indicates a relationship between the length (mm) of the protruding portion 23 and the flow rate (L/min.) in a case where the outlet flow passage 21 was provided at the angular position of 90° and deviated from the center of the vortex chamber 27 by 2 mm.

From FIG. 26, it can be seen that the flow rate Q is larger as the length of the protruding portion 23 is longer, regardless of the distance from the center of the vortex chamber 27 to the outlet flow passage 21. Therefore, under the condition where the inlet flow passage 19 is provided such that the inlet flow passage central axis P1 is arranged at a position away from the center of the vortex chamber 27 by the distance of 8 mm, the protruding portion 23 having a diameter of 4 mm and a circular column shape is provided at the angular position of 90° and deviated from the center of the vortex chamber 27 by the distance of 7.5 mm and the outlet flow passage 21 is provided at the angular position 90°, the flow rate Q can be adjusted and controlled by changing the length of the protruding portion 23, regardless of the position of the outlet flow passage 21 from the center of the vortex chamber 27. In addition, from FIG. 26, it can be seen that the flow rate Q is larger as the outlet flow passage 21 is provided farther from the center of the vortex chamber 27. Therefore, in order to obtain a larger flow rate, it is preferable that the outlet flow passage 21 is provided as far from the center of the vortex chamber 27 as possible.

Although the vortex-type flow control valve according to the present invention has been described with reference to the shown embodiments, the present invention is not limited to the shown embodiments. For example, in the shown embodiments, the circular cylindrical vortex chamber 27 is adopted, but an elliptical or polygonal cylindrical vortex chamber can also be adopted as long as the vortex flow can be generated in the vortex chamber 27. In addition, since the flow rate Q can be changed by changing the gap between the top part of the protruding portion 23 and the end wall opposite to the top part, the protruding portion 23 may be provided on the first end wall 15 instead of the second end wall 17.

DESCRIPTION OF REFERENCE NUMERALS

11 vortex-type flow control valve
13 peripheral side wall
15 first end wall
17 second end wall
17' diaphragm
19 inlet flow passage
21 outlet flow passage
23 protruding portion
25 drive unit
27 vortex chamber

The invention claimed is:

1. A vortex-type flow control valve comprising: a vortex chamber defined by a cylindrical peripheral side wall, a first end wall, and a second end wall, said first end wall and the second end wall provided opposite each other at both ends of the peripheral side wall; an inlet flow passage extending along an inlet flow passage central axis and being opened in the peripheral side wall; and an outlet flow passage extending along an outlet flow passage central axis and being opened in the first end wall, said vortex-type control valve configured so that fluid flowing in from the inlet flow passage generates a vortex flow in the vortex chamber and flows out into the outlet flow passage, wherein the inlet flow passage is provided such that the inlet flow passage central axis extends through a position away from a vortex chamber central axis connecting the center of the first end wall and the center of the second end wall, and the vortex-type flow control valve further comprises a protruding portion protruding into the vortex chamber from one of the first end wall and the second end wall, and a drive unit moving the protruding portion closer to or away from the other of the first end wall and the second end wall in the vortex chamber, said protruding portion being moved to adjust a flow rate of the fluid flowing out from the outlet flow passage, the protruding portion is provided at a position deviated from the outlet flow passage central axis.

2. The vortex-type flow control valve according to claim 1, wherein the protruding portion is provided at a position eccentric from the vortex chamber central axis.

3. The vortex-type flow control valve according to claim 2, wherein the protruding portion is provided such that at least a part of the protruding portion extends to overlap an extension of the inlet flow passage into the vortex chamber.

4. The vortex-type flow control valve according to claim 1, wherein the first end wall and the second end wall have a circular shape or an elliptical shape.

5. The vortex-type flow control valve according to claim 1, wherein the outlet flow passage is provided such that the outlet flow passage central axis extends through a position away from the inlet flow passage central axis.

6. The vortex-type flow control valve according to claim 5, wherein the outlet flow passage is provided such that the outlet flow passage central axis extends on the vortex chamber central axis.

7. The vortex-type flow control valve according to claim 5, wherein the outlet flow passage is provided such that the outlet flow passage central axis extends through a position deviated from the vortex chamber central axis toward the inlet flow passage central axis.

8. The vortex-type flow control valve according to claim 5, wherein the protruding portion has a circular cross section or an elliptical cross section.

9. The vortex-type flow control valve according to claim 5, wherein the drive unit drives the protruding portion to change a protruding length of the protruding portion into the vortex chamber.

10. The vortex-type flow control valve according to claim 5, wherein the protruding portion is provided on the second end wall.

11. The vortex-type flow control valve according to claim 10, wherein the second end wall is constituted by a diaphragm, and the protruding portion is attached to the diaphragm so that the protruding portion is driven by the drive unit via the diaphragm.

* * * * *